(12) United States Patent
Tawara et al.

(10) Patent No.: US 9,454,831 B2
(45) Date of Patent: Sep. 27, 2016

(54) INFORMATION PROCESSING DEVICE, INFORMATION PROCESSING METHOD, AND COMPUTER-READABLE RECORDING MEDIUM TO PRSCRIBE AN AREA IN AN IMAGE

(71) Applicant: SONY CORPORATION, Tokyo (JP)

(72) Inventors: Tetsuo Tawara, Tokyo (JP); Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 14/301,282

(22) Filed: Jun. 10, 2014

(65) Prior Publication Data

US 2014/0368510 A1    Dec. 18, 2014

(30) Foreign Application Priority Data

Jun. 17, 2013    (JP) .................................. 2013-126615

(51) Int. Cl.
*G06T 11/20* (2006.01)
*G06F 3/0484* (2013.01)

(52) U.S. Cl.
CPC ......... *G06T 11/203* (2013.01); *G06F 3/04842* (2013.01); *G06F 3/04845* (2013.01)

(58) Field of Classification Search
CPC ...... G06T 11/203; G06T 3/048; G06T 17/30
USPC ........................................................ 345/411
See application file for complete search history.

(56) References Cited

U.S. PATENT DOCUMENTS

| 6,195,445 B1 * | 2/2001 | Dubuisson-Jolly | G06K 9/3216 382/107 |
| 2002/0040357 A1 * | 4/2002 | Miller | G06K 9/00973 706/20 |
| 2004/0199123 A1 * | 10/2004 | Nielsen | A61M 5/14 604/180 |
| 2005/0249391 A1 * | 11/2005 | Kimmel | G06T 7/0081 382/128 |
| 2012/0070068 A1 * | 3/2012 | Pal | G06T 17/00 382/154 |
| 2012/0312250 A1 * | 12/2012 | Jesurum | A04K 15/023 119/721 |
| 2013/0135305 A1 * | 5/2013 | Bystrov | G06T 7/0079 345/420 |
| 2013/0328760 A1 * | 12/2013 | Honea | G06K 9/4671 345/156 |
| 2014/0046185 A1 * | 2/2014 | Mo | A61B 8/467 600/443 |

FOREIGN PATENT DOCUMENTS

JP    H06-028439 A    2/1994

OTHER PUBLICATIONS

Barrett et al, Interactive live-wire boundary extraction, 1996, Oxford University Press, Medical Image Analysis, vol. 1, No. 4, pp. 331-341.*

* cited by examiner

*Primary Examiner* — James A Thompson
(74) *Attorney, Agent, or Firm* — Chip Law Group

(57) ABSTRACT

There is provided an information processing device including an area decision processing unit configured to set, on the basis of at least three vertices designated to decide a boundary of an area to be defined in a map and on the basis of a drawing locus input to include at least three of the vertices, a boundary region by sequentially adding boundary line segments connecting one of the vertices to be a starting point from among the vertices included inside the drawing locus with points on the drawing locus in accordance with an input order of the drawing locus, configured to sequentially decide the vertices constituting respective area definition line segments for deciding the boundary of the area, and configured to decide, as the area, a region prescribed by connecting the area definition line segments.

10 Claims, 21 Drawing Sheets

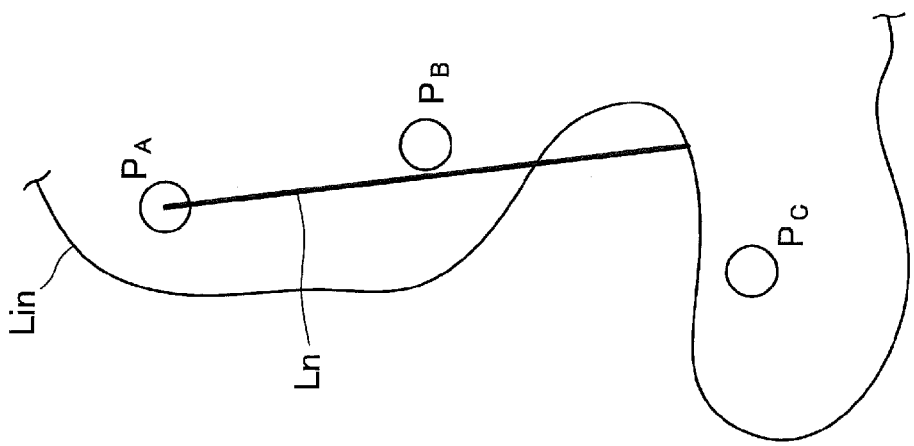
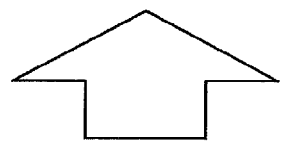
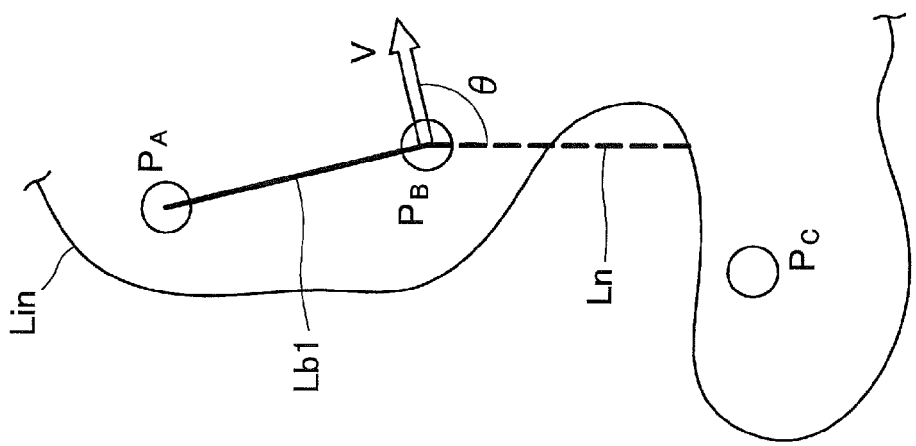
FIG.21

FIG. 28
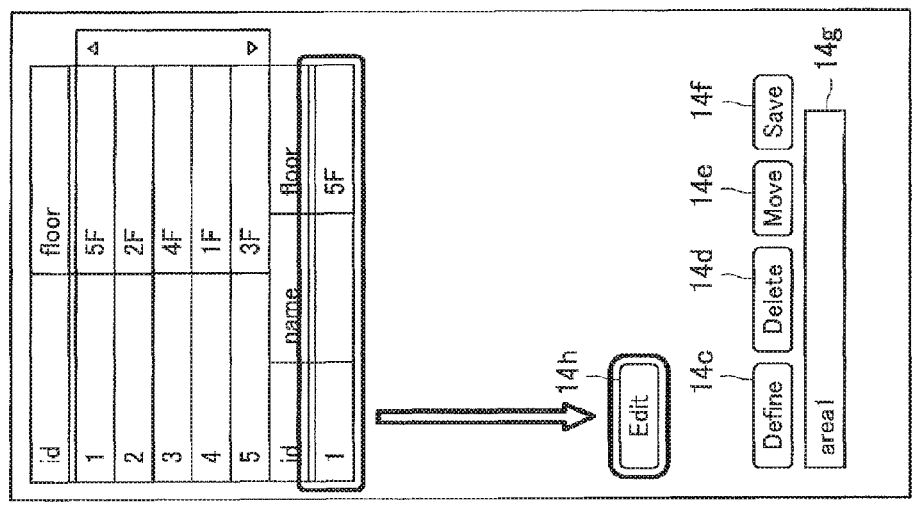
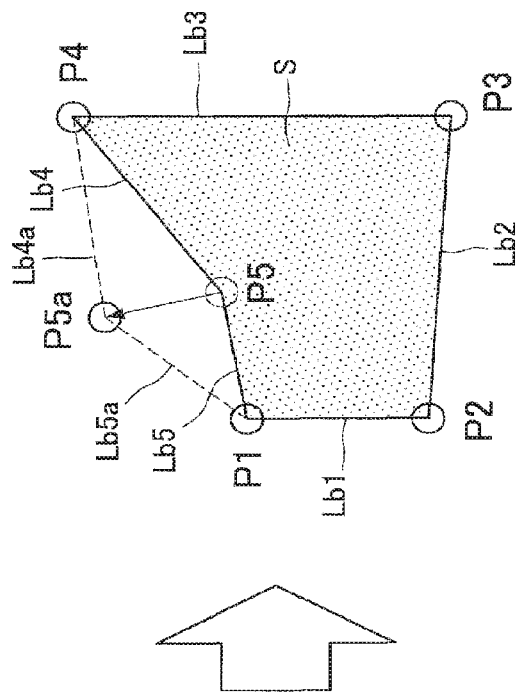

INFORMATION PROCESSING DEVICE, INFORMATION PROCESSING METHOD, AND COMPUTER-READABLE RECORDING MEDIUM TO PRSCRIBE AN AREA IN AN IMAGE

CROSS REFERENCE TO RELATED APPLICATIONS

This application claims the benefit of Japanese Priority Patent Application JP 2013-126615 filed Jun. 17, 2013, the entire contents of which are incorporated herein by reference.

BACKGROUND

The present disclosure relates to an information processing device, an information processing method, and a computer-readable recording medium, that define any area in an image.

When a user defines an area in a map displayed on a display device, vertices to prescribe the area are serially designated by moving a cursor using a mouse or the like, and finally, the area can be defined by sequentially connecting the designated vertices, for example.

For example, JP H6-28439A discloses an element selection method using polygon field designation in which a field is designated by a mouse drag operation, a polygon is drawn, and elements included in the field is selected and output.

SUMMARY

However, in the case where a polygon is drawn by a mouse drag operation such as JP H6-28439A, there is detailed work to match vertices in order to define a plurality of adjacent areas for example, and the user has to pay a great attention to define the areas.

Accordingly, the present disclosure provides a novel and improved information processing device, information processing method, and computer-readable recording medium that are capable of reducing attention paid by the user when defining an area and easily defining the area.

According to an embodiment of the present disclosure, there is provided an information processing device including an area decision processing unit configured to set, on the basis of at least three vertices designated to decide a boundary of an area to be defined in a map and on the basis of a drawing locus input to include at least three of the vertices, a boundary region by sequentially adding boundary line segments connecting one of the vertices to be a starting point from among the vertices included inside the drawing locus with points on the drawing locus in accordance with an input order of the drawing locus, configured to sequentially decide the vertices constituting respective area definition line segments for deciding the boundary of the area, and configured to decide, as the area, a region prescribed by connecting the area definition line segments.

According to an embodiment of the present disclosure, there is provided an information processing method including detecting at least three vertices designated to decide a boundary of an area to be defined in a map and a drawing locus input to include at least three of the vertices, setting, on the basis of the vertices and the drawing locus, a boundary region by sequentially adding boundary line segments connecting one of the vertices to be a starting point from among the vertices included inside the drawing locus with points on the drawing locus in accordance with an input order of the drawing locus, and sequentially deciding the vertices constituting respective area definition line segments for deciding the boundary of the area, and deciding, as the area, a region prescribed by connecting the area definition line segments.

According to an embodiment of the present disclosure, there is provided a non-transitory computer-readable recording medium having a program stored therein, the program causing a computer to execute setting, on the basis of at least three vertices designated to decide a boundary of an area to be defined in a map and on the basis of a drawing locus input to include at least three of the vertices, a boundary region by sequentially adding boundary line segments connecting one of the vertices to be a starting point from among the vertices included inside the drawing locus with points on the drawing locus in accordance with an input order of the drawing locus, and sequentially deciding the vertices constituting respective area definition line segments for deciding the boundary of the area, and deciding, as the area, a region prescribed by connecting the area definition line segments.

According to one or more of embodiments of the present disclosure, when a certain area is designated in a processing target such as a map, a user designates at least three vertices on the map to be the processing target and inputs a drawing locus to surround vertices to be included in the area. After receiving the input, the information processing device performs the above described processing and the area is defined automatically.

As described above, according to embodiments of the present disclosure, it is possible to reduce attention paid by the user in the case of the area definition and to easily define an area.

BRIEF DESCRIPTION OF THE DRAWINGS

FIG. 21 is an explanatory diagram illustrating a validity check of a starting point;

FIG. 28 is an explanatory diagram showing a procedure for moving a vertex in the defined area.

DETAILED DESCRIPTION OF THE EMBODIMENT(S)

Figure 1:
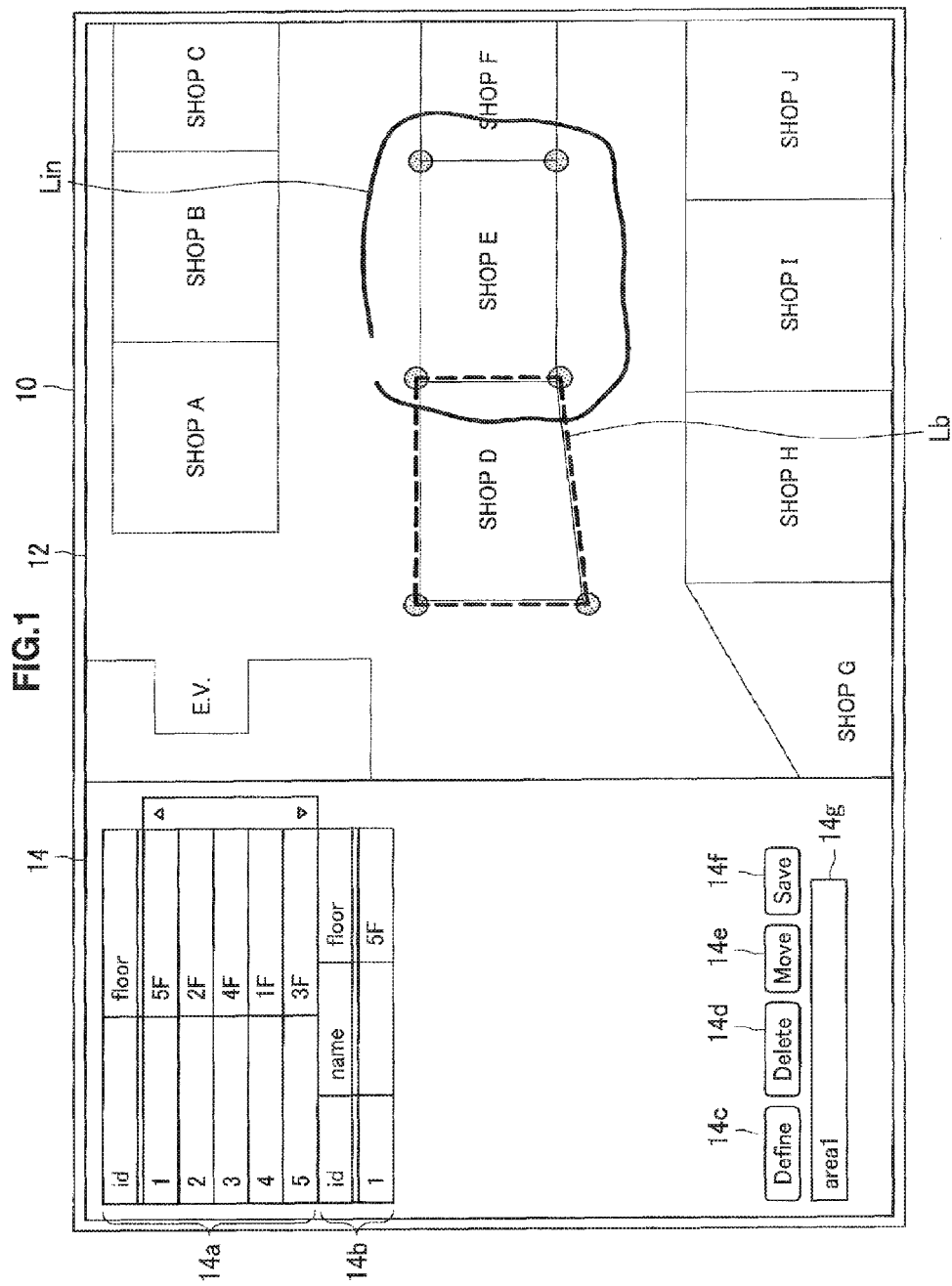
FIG. 1 is an explanatory diagram illustrating an example of area definition processing according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview of Area Definition Processing
2. Configuration of Information Processing Device
3. Area Definition Processing
4. Area Editing
4.1. Plural Area Setting
4.2. Area Editing by User
5. Conclusion

1. OVERVIEW OF AREA DEFINITION PROCESSING

Figure 2:
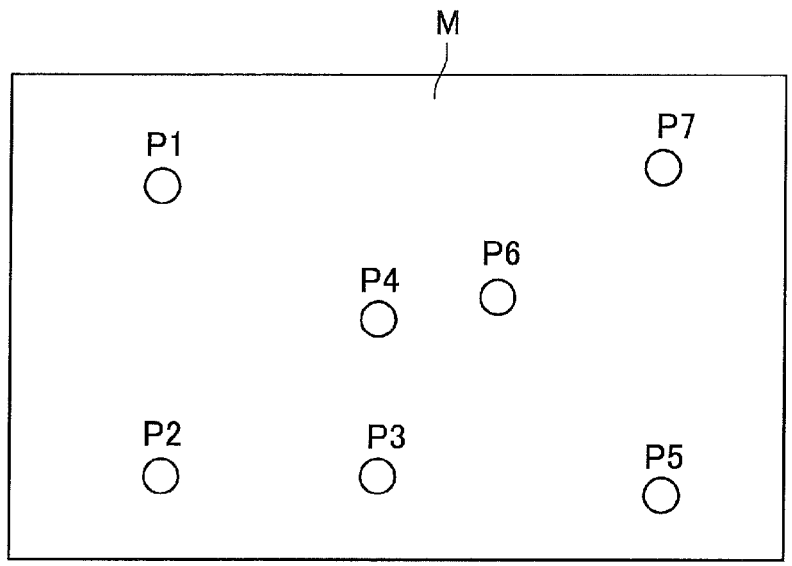
FIG. 2 is an explanatory diagram that shows an overview of a procedure for defining an area using the area definition processing according to the embodiment, and that shows a state where seven vertices are designated in the processing target.
Figure 3:
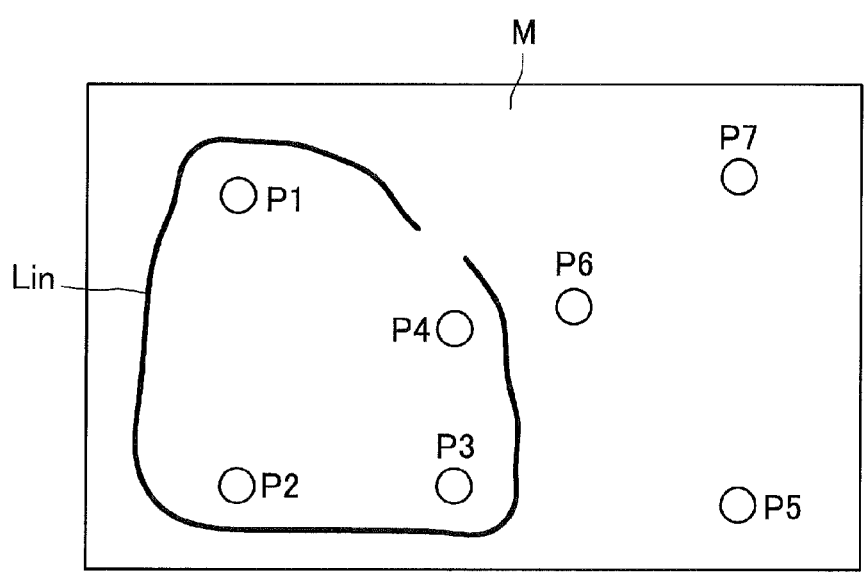
FIG. 3 is an explanatory diagram showing a state where vertices to be included in a defined convex area are designated by a drawing locus from among the vertices designated in FIG. 2.
Figure 4:
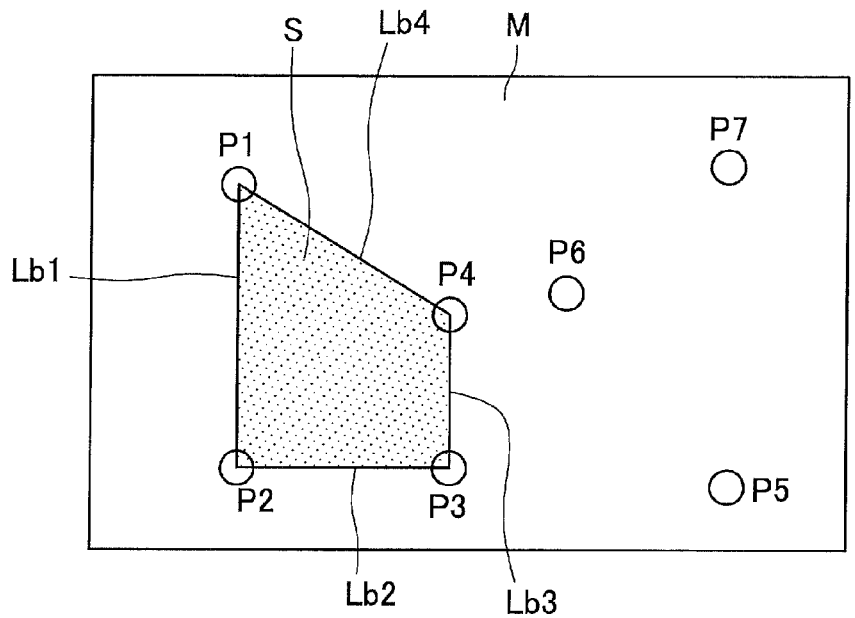
FIG. 4 is an explanatory diagram showing a state where the convex area is defined on the basis of the drawing locus designated in FIG. 3.
Figure 7:
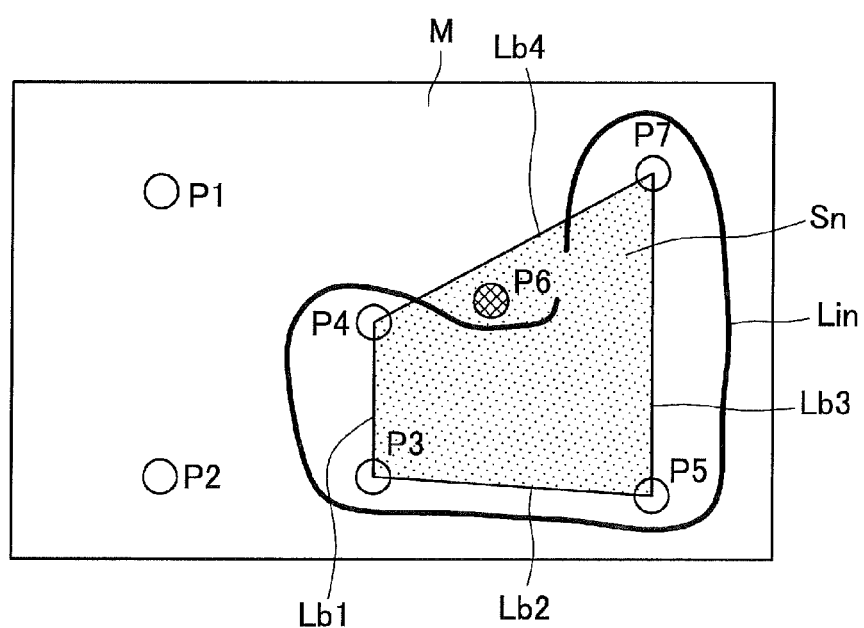
FIG. 7 is an explanatory diagram showing a state where, after the state in FIG. 6, it is recognized that the concave area is defined on the basis of the drawing locus.
Figure 8:
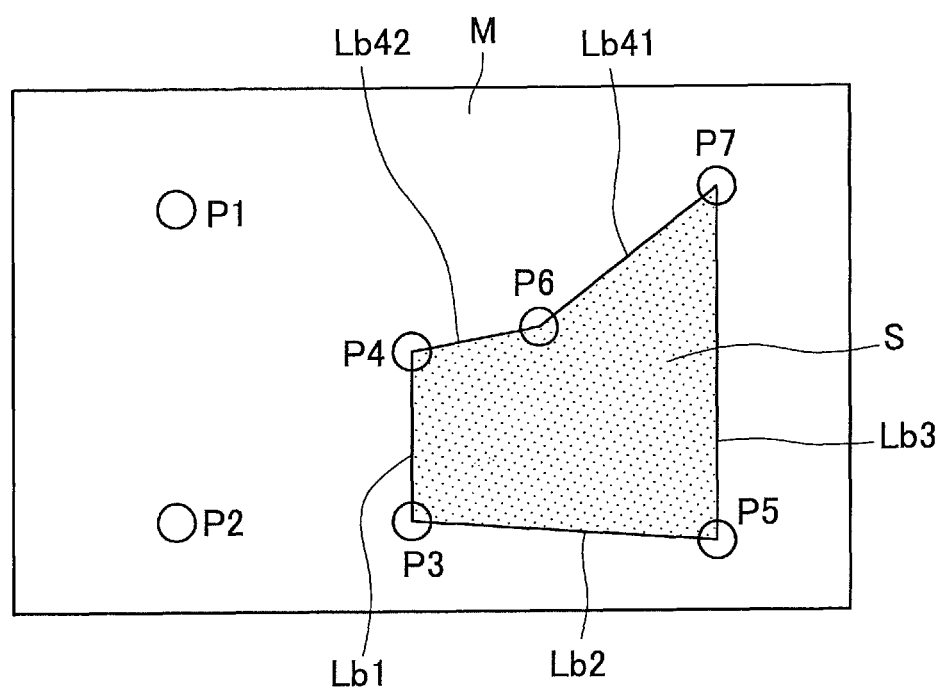
FIG. 8 is an explanatory diagram showing a state where the concave area is defined after the state in FIG. 6.
Figure 9:
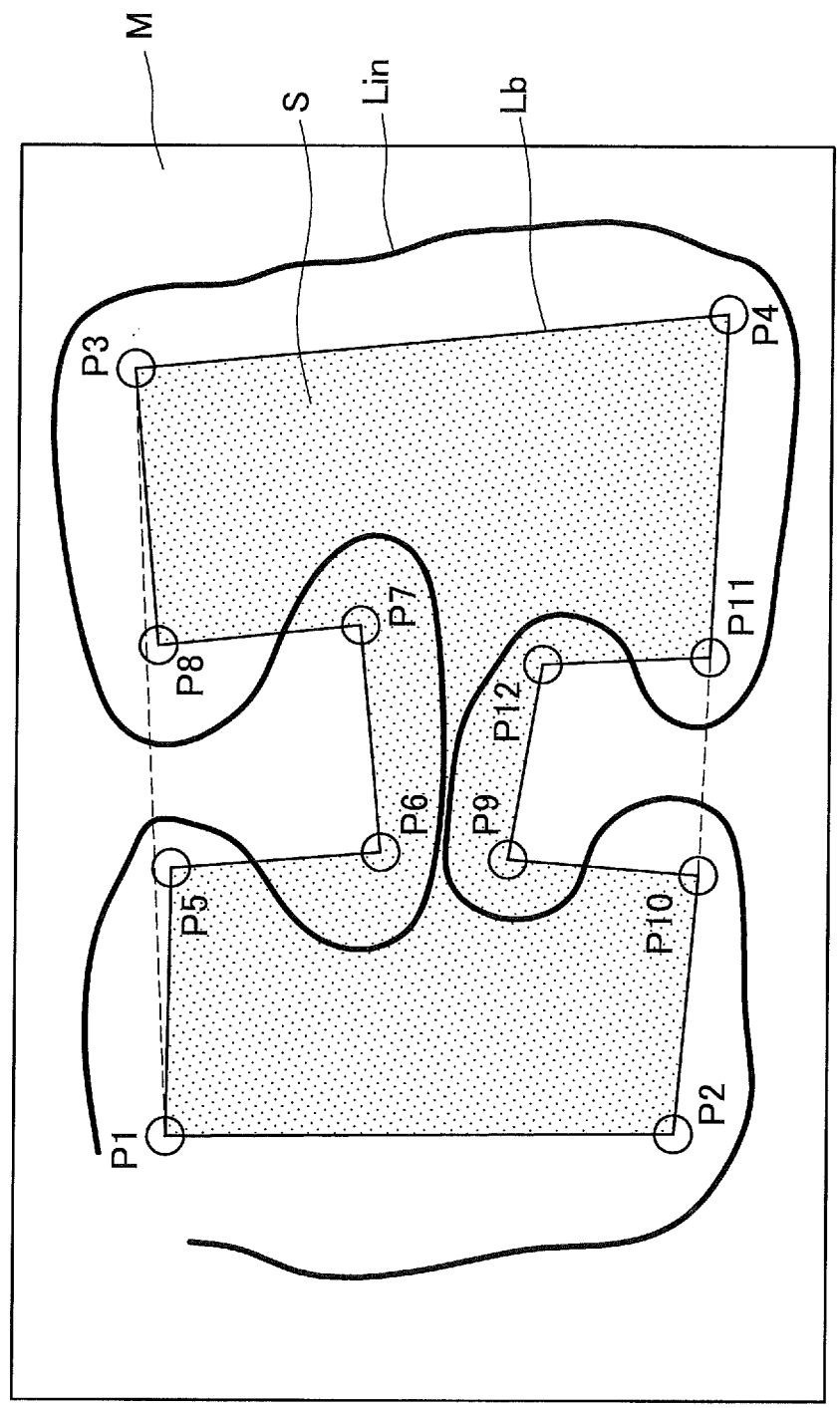
FIG. 9 is an example of a shape of a convex area decided by the area definition processing according to the embodiment, and is an explanatory diagram showing the concave area having two concave portions.
Figure 10:
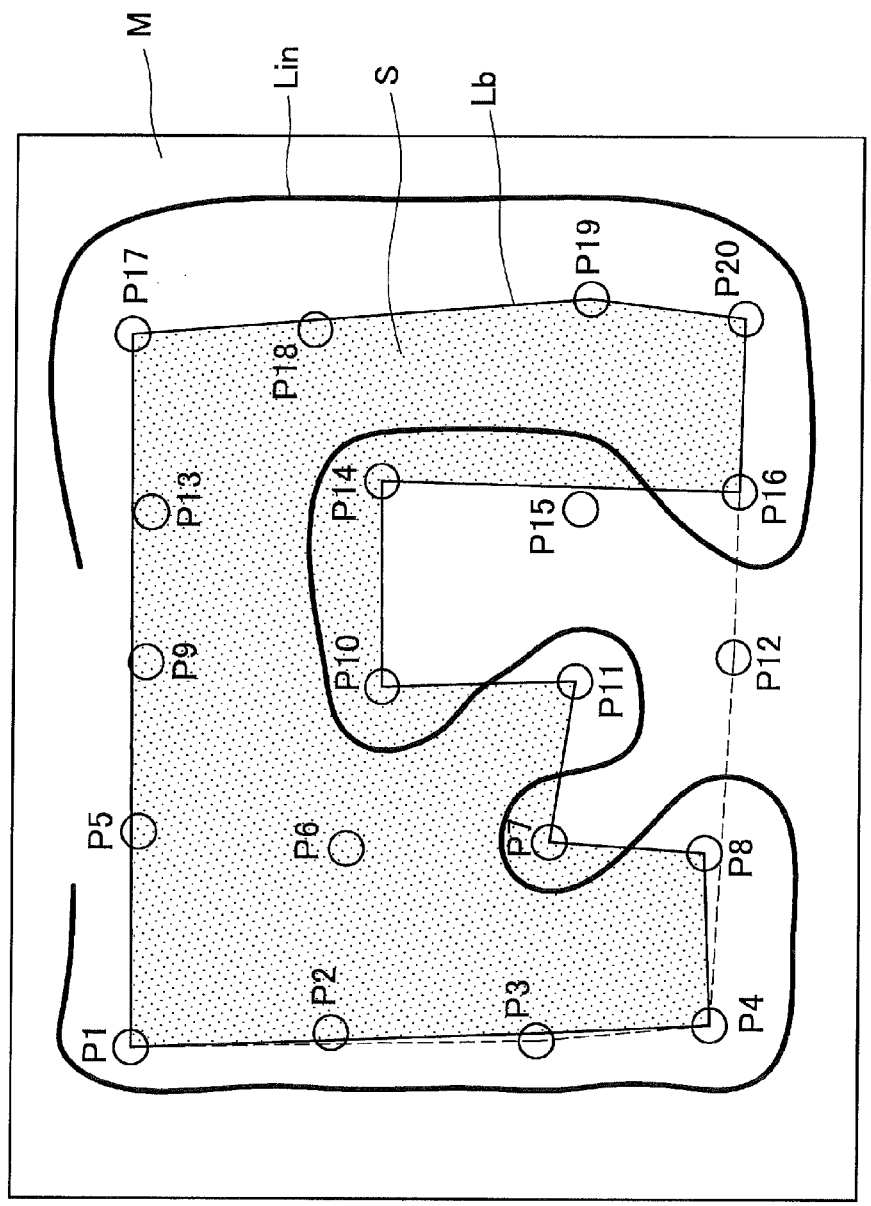
FIG. 10 is an explanatory diagram showing a concave area having a step-like concave portion as an example of the shape of the convex area decided by the area definition processing according to the embodiment.

With reference to FIGS. 1 to 10, there will be described an overview of area definition processing performed by an information processing device according to an embodiment of the present disclosure. FIG. 1 is an explanatory diagram illustrating an example of area definition processing according to an embodiment of the present disclosure. FIGS. 2 to 4 are explanatory diagrams showing an overview of a procedure for defining a convex area using the area definition processing according to embodiments of the present disclosure. FIGS. 5 to 8 are explanatory diagrams showing an overview of a procedure for defining a concave area using the area definition processing according to embodiments of the present disclosure. FIGS. 9 and 10 are explanatory diagrams showing examples of shapes of convex areas decided by the area definition processing according to embodiments of the present disclosure.

An information processing device according to an embodiment of the present disclosure performs processing for defining an area in an image displayed on a display unit of a display or the like, on the basis of information input by a user. For example, as shown in FIG. 1, a display unit 10 displays a target display region 12 for displaying a processing target such as a map, and an operation input region 14 in which operation input is performed, the operation input performing processing such as selecting an area, moving the selected area, and deleting the selected area on the processing target.

For example, the target display region 12 in FIG. 1 displays a floor map as a processing target. The operation input region 14 displays a target list 14a showing targets displayable in the target display region 12, and a definition area list 14b displaying an area defined in the processing target. In addition, the operation input region 14 displays a "Define" button 14c for deciding an area to be defined in the processing target, and a "Delete" button 14d for deleting a selected area. Furthermore, the operation input region 14 displays a "Move" button 14e for moving a selected area, and a "Save" button 14f for saving changes to the processing target. The operation input region 14 further displays an input box 14g for inputting a name of an area to be defined.

With regard to the processing target displayed in the target display region 12, a partial area of the processing target is selected by a cursor that is operable by an input device such as a mouse and a keyboard. On the basis of input information input by a cursor operation on the processing target, the information processing apparatus according to embodiments of the present disclosure performs processing for specifying an area to be selected by a user.

Here, an overview of area definition processing by an information processing device according to an embodiment of the present disclosure is described. As shown in FIG. 2, a user inputs vertices for defining an area in the processing target M. With regard to the vertices, at least three vertices are designated in order to define an area. In FIG. 2, seven vertices P1 to P7 are designated. Subsequently, as shown in FIG. 3, the user inputs a drawing locus $L_{in}$ so as to include vertices to be included in an area to be defined from among the designated vertices P1 to P7. Inside the drawing locus $L_{in}$, at least three vertices are included in order to define the area. In FIG. 3, the drawing locus $L_{in}$ is input so as to surround vertices P1 to P4.

As shown in FIG. 4, the information processing device connects a vertex P1 with a vertex P2, the vertex P2 with a vertex P3, the vertex P3 with a vertex P4, and the vertex P4 with the vertex P1, respectively, and defines an area S after receiving input of the vertices in FIG. 2 and input of the drawing locus in FIG. 3.

Figure 5:
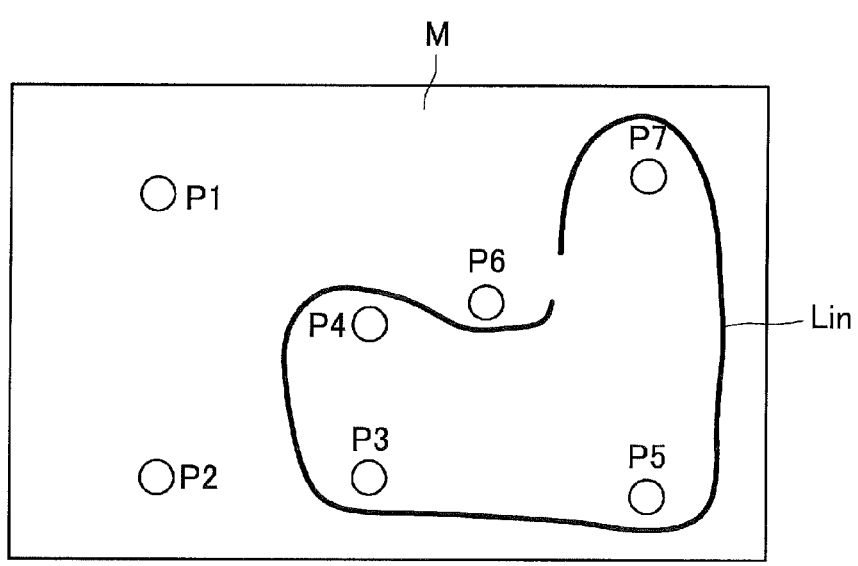
FIG. 5 is an explanatory diagram showing a state where vertices to be included in a defined concave area are designated by a drawing locus from among the vertices designated in FIG. 2.

The area S defined in FIG. 4 has a convex shape. However, an area having a concave shape can also be defined using an area definition processing by an information processing apparatus according to embodiments of the present embodiment. For example, as shown in FIG. 2, the seven vertices P1 to P7 are designated. Subsequently, as shown in FIG. 5, the user inputs a drawing locus $L_{in}$ so as to include vertices to be included in an area to be defined from among the designated vertices P1 to P7. In FIG. 5, the drawing locus $L_{in}$ is input so as to surround vertices P3 to P5 and P7.

Figure 6:
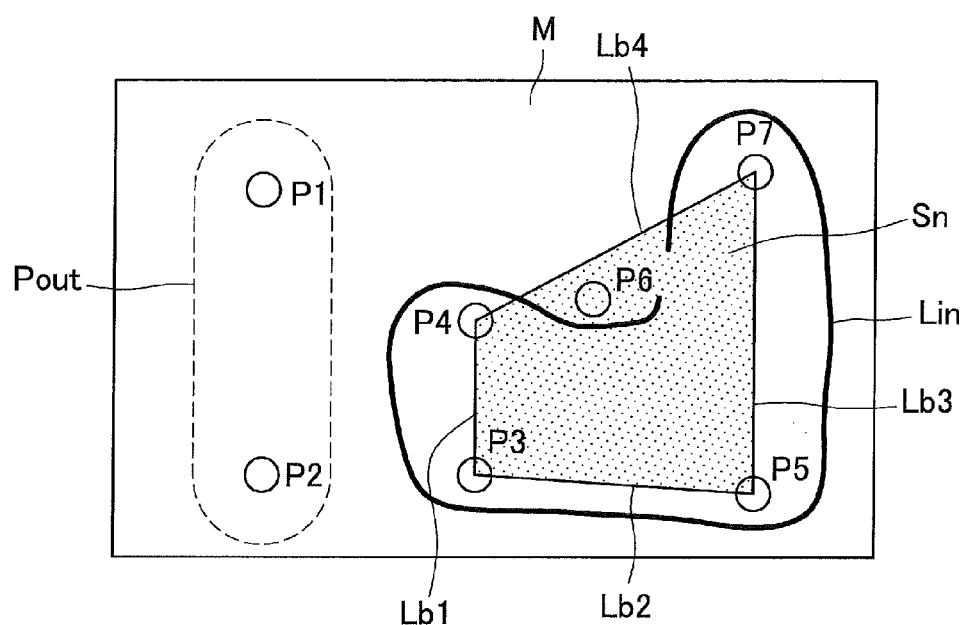
FIG. 6 is an explanatory diagram showing a state where, in the middle of concave-area definition process, a convex area is being formed on the basis of the drawing locus designated in FIG. 5.

At this time, as shown in FIG. 6, the information processing apparatus sets the vertices P1 and P2 that are not included in the vertices P3 to P5 and P7 included inside the drawing locus $L_{in}$, as not-target vertices $P_{out}$ that are not targets for a processing for deciding a definition area. Next, on the basis of the vertices P3 to P7 and the drawing locus $L_{in}$, the information processing device defines an area Sn. As shown in FIG. 7, although the vertex P6 is included in a convex area defined by the vertices P3 to P5 and P7, the vertex P6 is positioned outside the drawing locus $L_{in}$. Accordingly, it is determined that the vertex P6 is not included an area the user wants to define. Eventually, as shown in FIG. 8, a concave-shaped area S is defined by connecting the vertices P4 with P3 using a boundary line segment Lb1, the vertices P3 with P5 using a boundary line segment Lb2, the vertices P5 with P7 using a boundary line segment Lb3, the vertices P7 with P6 using a boundary line segment Lb41, and the vertices P6 with P4 using a boundary line segment Lb42, respectively.

In addition, it is possible for the area definition processing according to the embodiment to define not only areas having simple shapes such as the convex-shaped area shown in FIG. 4 and the concave-shaped area shown in FIG. 8, but also more-complex areas. For example, as shown in FIG. 9, vertices P1 to P12 are designated, a drawing locus $L_{in}$ is input so as to exclude the vertices P6, P7, P9, and P12, and then an area S having two concave portions is defined by a boundary line segment Lb. On the other hand, as shown in FIG. 10 for example, vertices P1 to P20 are designated, a drawing locus $L_{in}$ is input so as to exclude the vertices P7, P10, P12, P14, and P15, and then an area S having a step-like concave portion is defined.

According to such area definition processing, a user designates vertices for defining an area in a processing target, and then inputs a drawing locus so as to surround only vertices to be included in the area to be defined from among the designated vertices. Therefore, the information processing device automatically defines the area that the user wants to define. In this situation, the user draws a drawing locus unicursally so as to sort out vertices to be included in the area from vertices not to be included in the area. The information processing device considers the unicursally-drawn drawing locus as a single string, stretches a drawing starting point and a drawing end point simultaneously, and defines, as the area, a region having a shape formed by hooking the drawing locus considered as the string on the vertices included inside the drawing locus. In the following paragraphs, there will be described in detail a configuration of the image processing device according to the embodiment and the area definition processing performed by the image processing device.

2. CONFIGURATION OF INFORMATION PROCESSING DEVICE

Figure 11:
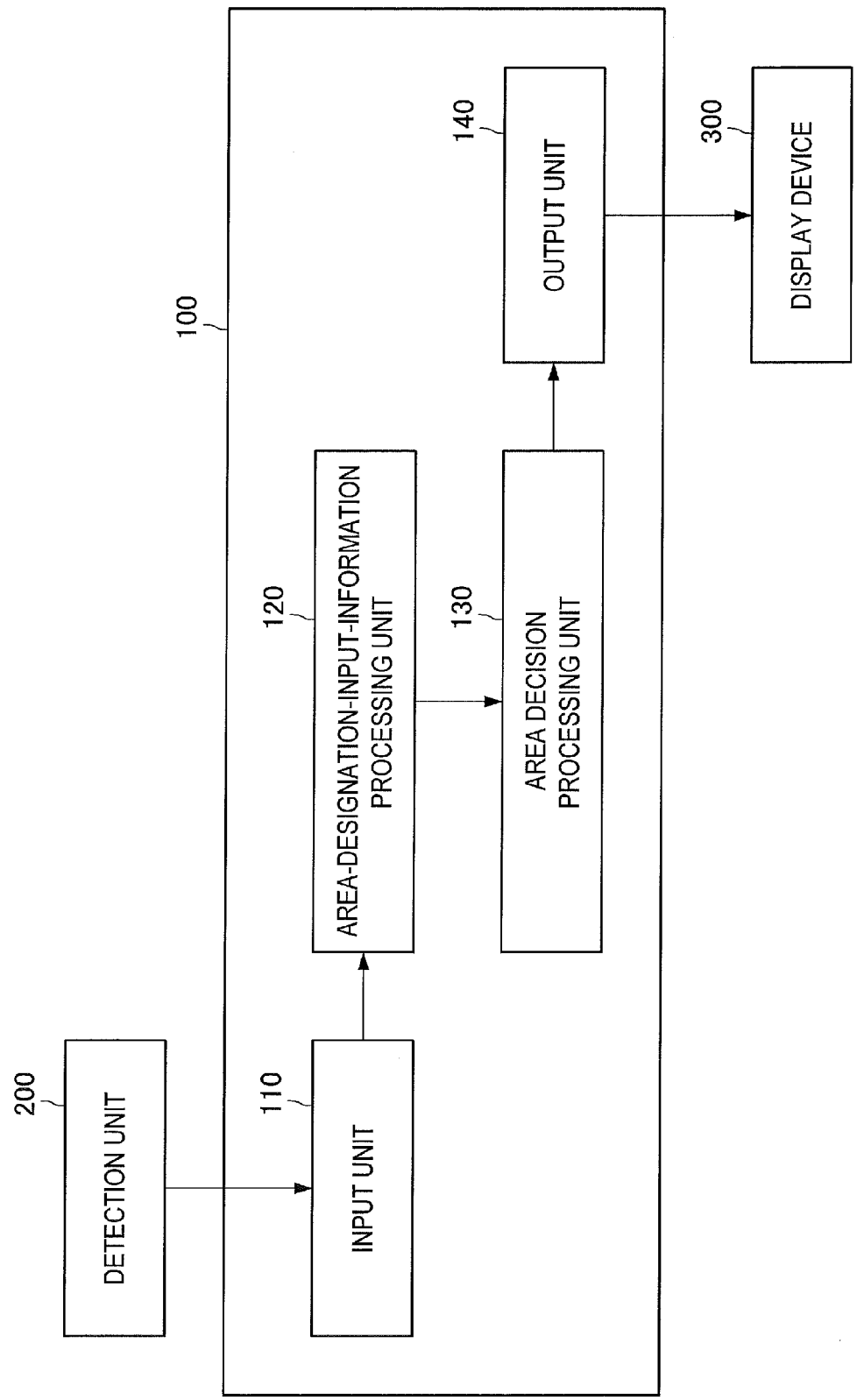
FIG. 11 is a functional bock diagram showing a functional configuration of an image processing device according to the embodiment.

FIG. 11 shows a functional configuration of an image processing device 100 according to the embodiment. As shown in FIG. 11, the information processing device 100 according to the embodiment includes an input unit 110, an area-designation-input-information processing unit 120, an area decision processing unit 130, and an output unit 140.

The input unit 110 receives input information input by a user from a detection unit 200 for detecting operation input, and outputs the input information to the area-designation-input-information processing unit 120. The detection unit 200 may be an information detection unit such as a CPU for detecting, on the basis of operation input using an input device such as a mouse and a keyboard, input information input by a user. On the other hand, the detection unit 200 may be a touch sensor integrally formed with the display unit 10.

On the basis of the input information, the area-designation-input-information processing unit 120 specifies positions (vertices) and a field (drawing locus) that are designated in the processing target, and output the positions and the field to the area decision processing unit 130. In the area-designation-input-information processing unit 120, the positions (vertices) and the field (drawing locus) that are designated in the processing target are specified as coordinate information in the target display region 12 of the display unit 10.

On the basis of the positions and the field that are designated in the processing target, the area decision processing unit 130 calculates and decides an area to be actually defined by the user. The area decision processing unit 130 outputs the decided area to the output unit 140.

The output unit 140 performs display processing for displaying the area decided by the area decision processing unit 130 on the display device 300, and outputs the area to the display device 300. On the display device 300, the area output from the output unit 140 is displayed at corresponding position in the target display region 12. The display device 300 is, for example, a liquid crystal display or an organic electroluminescent display, and includes the display unit 10.

Such information processing device 100 may be constituted of an arithmetic processing unit such as a CPU. On the other hand, it is possible for the information processing device 100 to be provided as a computer program for causing a computer to function as the information processing device 100 according to the embodiment. The computer program is stored in a storage device included in the computer, and read and executed by a CPU included in the computer, such that the computer functions as the image processing device. The information processing device 100 may also be provided as a computer-readable recording medium having a computer program recorded thereon. The recording medium is, for example, a magnetic disk, an optical disc, or an USB memory with a flash memory.

3. AREA DEFINITION PROCESSING

Figure 22:
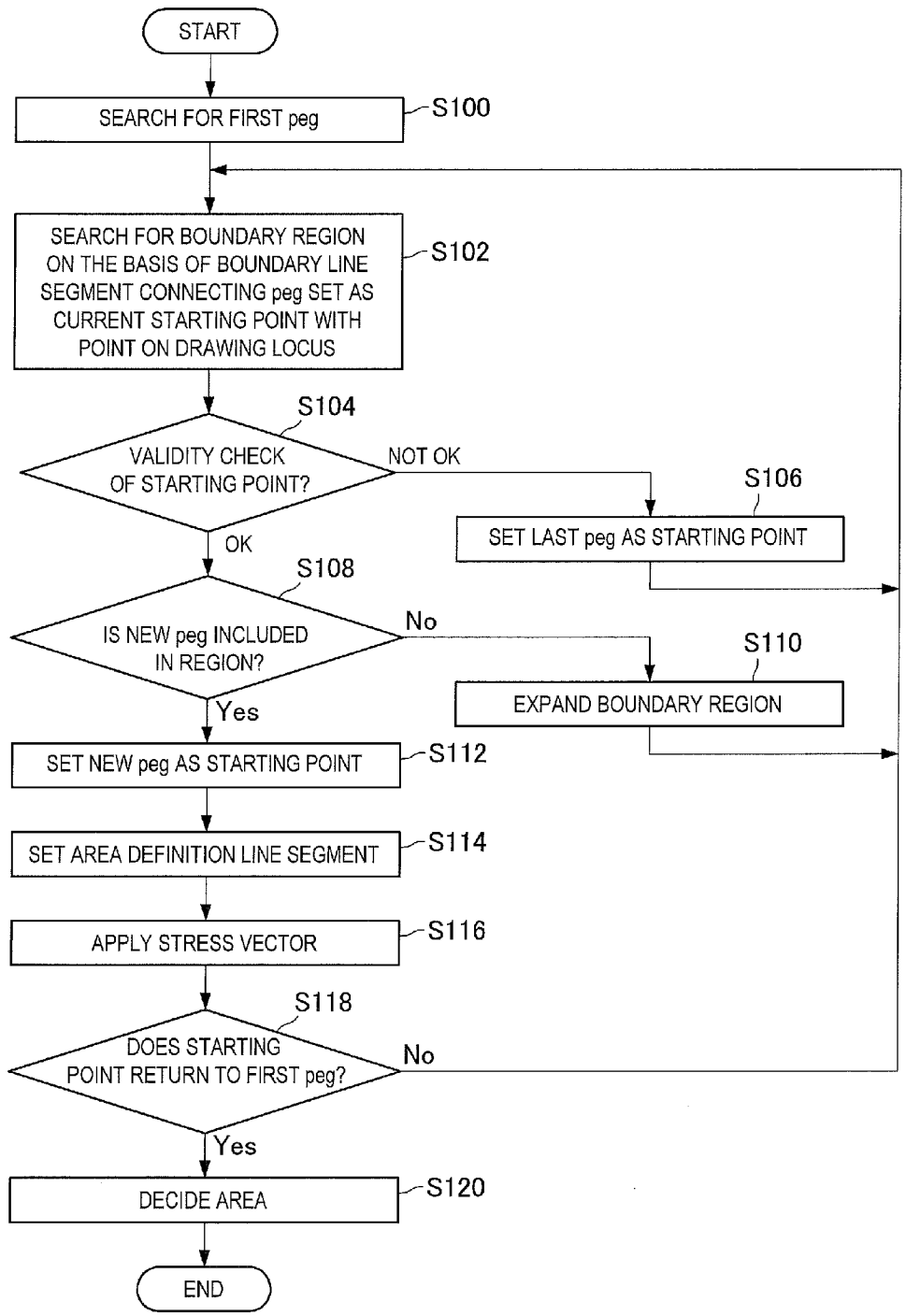
FIG. 22 is a flowchart showing area definition processing according to the embodiment.
Figure 23:
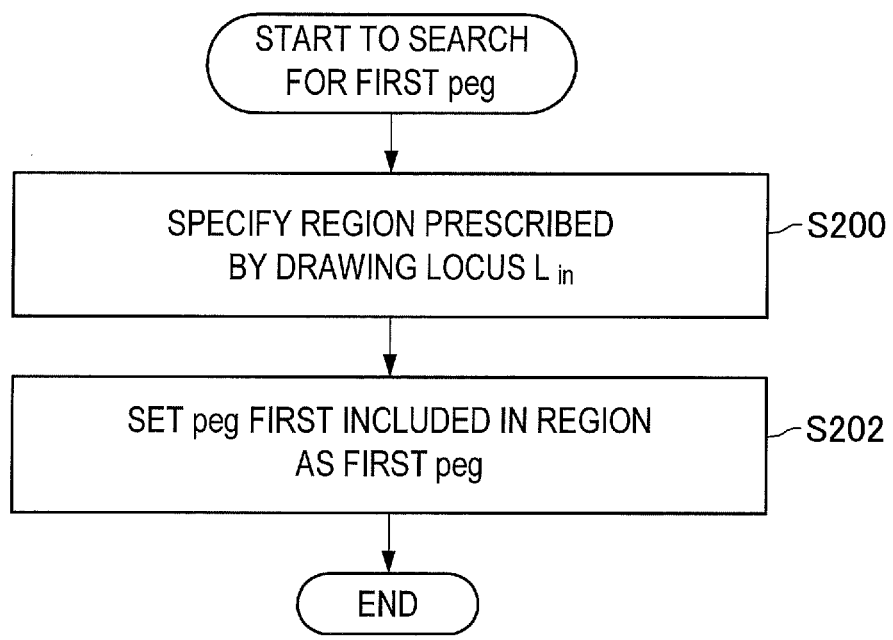
FIG. 23 is a flowchart showing first-peg search processing.
Figure 24:
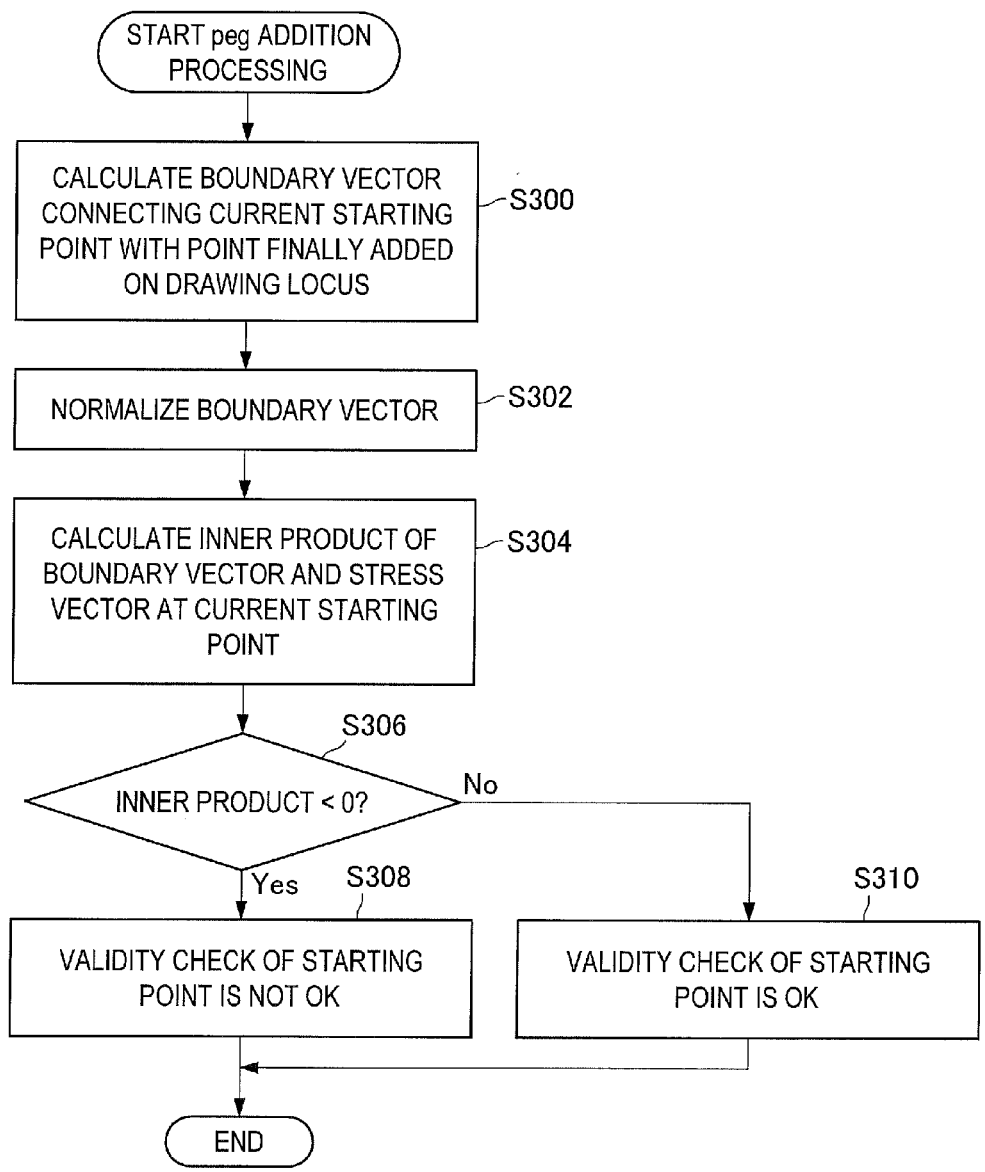
FIG. 24 is a flowchart showing peg addition processing.
Figure 25:
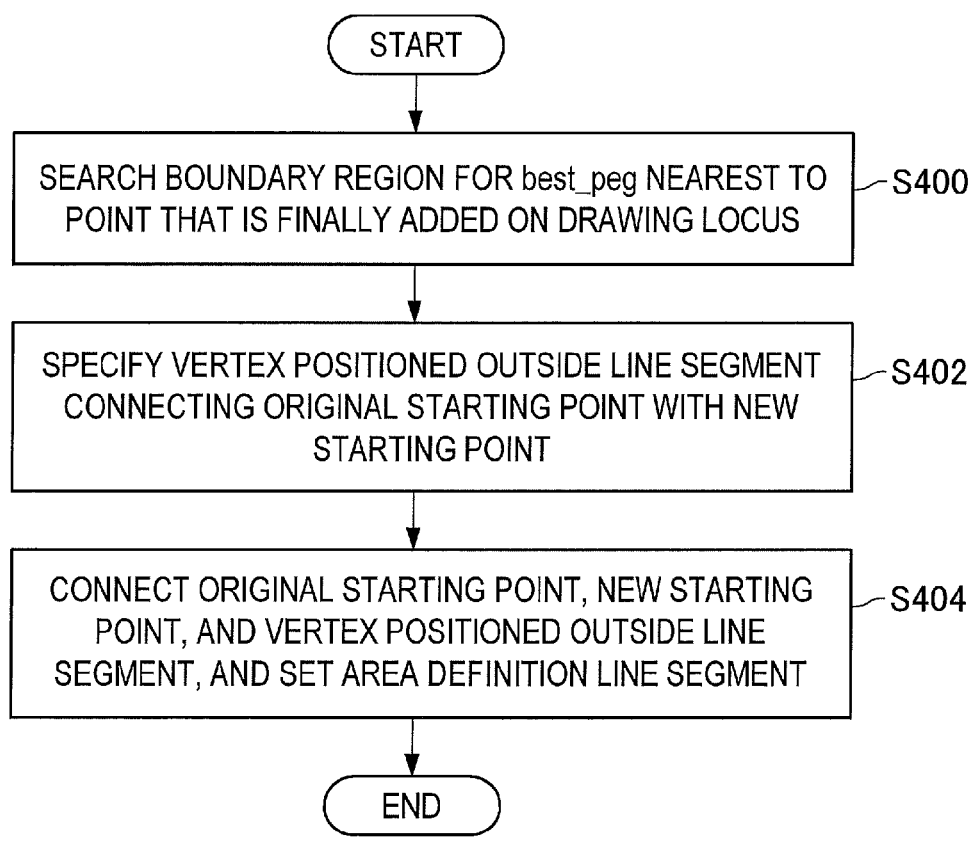
FIG. 25 is a flowchart showing a way to decide an starting point and an area definition line segment when a plurality of vertices are included in a boundary region.

Hereinafter, the area definition processing according to the embodiment will be described in detail with reference to FIGS. 12 to 25. FIGS. 12 to 21 are explanatory diagrams that show procedures for defining an area using the area definition processing according to the embodiment. FIG. 22 is a flowchart showing area definition processing according to the embodiment. FIG. 23 is a flowchart showing first-peg search processing. FIG. 24 is a flowchart showing peg addition processing. FIG. 25 is a flowchart showing stress-vector calculation processing. In the following paragraphs, a vertex designated by a user may be referred to as a "peg".

Figure 12:
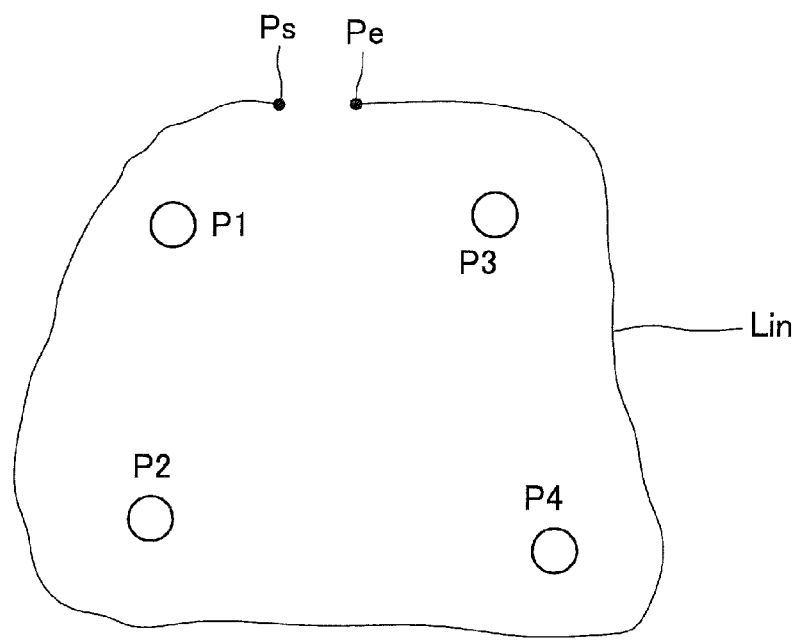
FIG. 12 is an explanatory diagram that shows a procedure for defining an area using the area definition processing according to the embodiment, and that shows a state where four vertices and a drawing locus are input.

The area definition processing according to the embodiment is started by designating at least three vertices by a user, and subsequently inputting a drawing locus surrounding at least three vertices to be included in an area from among the designated vertices in the processing target. For example, as shown in FIG. 12, four vertices P1 to P4 are designated, and a drawing locus $L_{in}$ surrounding all of the vertices P1 to P4 is input. On the drawing locus $L_{in}$ input by the user, a position where the drawing starts is referred to as a drawing starting point Ps, and a position where the drawing ends is referred to as a drawing end point Pe. Note that, as shown in FIG. 12, in the case where the drawing starting point Ps does not match with the drawing end point Pe, it is recognized as if the drawing starting point Ps is connected with the drawing end point Pe and the drawing locus $L_{in}$ is closed, and processing shown in FIG. 22 starts.

When the vertices and the drawing locus shown in FIG. 12 are input, the area-designation-input-information processing unit 120 of the information processing device 100 calculates coordinates of the vertices and the drawing locus in the target display region 12. Next, as shown in FIG. 22, the area-designation-input-information processing unit 120 searches for a first peg to be a first starting point in order to define an area from the at least three input vertices (S100).

The first peg is searched for in accordance with the flowchart shown in FIG. 23. First, the area-designation-input-information processing unit 120 specifies a region prescribed by the input drawing locus $L_{in}$ (S200). Subsequently, the area-designation-input-information processing unit 120 sets, as the first peg, a vertex at a closest position to the drawing starting point on the drawing locus, from among the vertices included in the region specified in the step S200 (S202).

For instance, in an example shown in FIG. 12, the region prescribed by the drawing locus $L_{in}$ in step S200 is specified. At this time, the region includes vertices P1, P2, P3, and P4. Then, in step S202, the vertex P1 is set as a first peg from among the vertices P1 to P4 included in the region prescribed by the drawing locus $L_{in}$, the vertex P1 being positioned nearest to the drawing starting point Ps on the drawing locus $L_{in}$.

Figure 13:
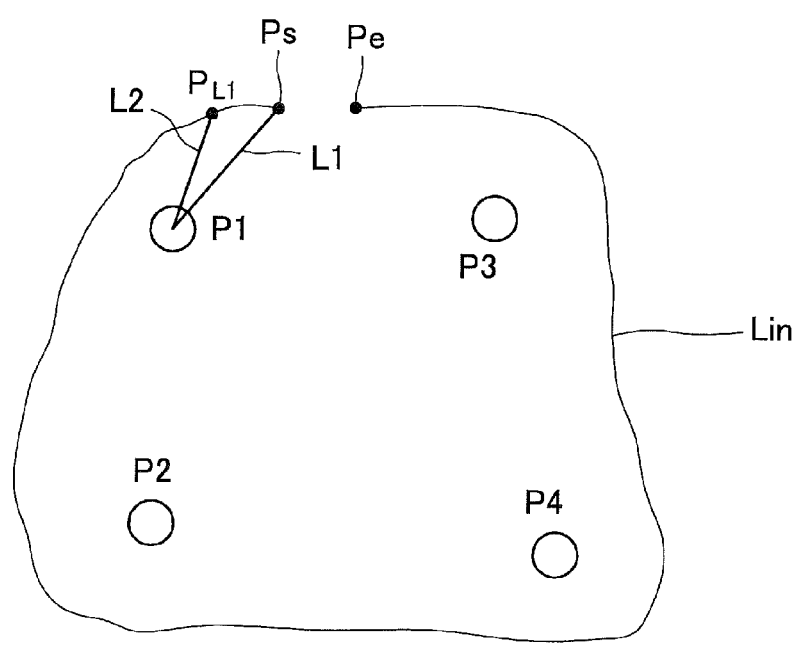
FIG. 13 is an explanatory diagram showing a state where, on the basis of the vertices and the drawing locus input in FIG. 12, a boundary line segment is added and a boundary region is obtained.

Going back to the explanation about FIG. 22, after the first peg is set in step S100, the area decision processing unit 130 searches for a boundary region on the basis of a boundary line segment connecting the vertex set as the current starting point with a point on the drawing locus (S102). For example, as shown in FIG. 12, when the vertices P1 to P4 and the drawing locus $L_{in}$ are input, the area decision processing unit 130 first sets a boundary line segment connecting the vertex P1 set as the first starting point with a point on the drawing locus $L_{in}$. Points on the drawing locus $L_{in}$ are set in accordance with an input order of the drawing locus from the drawing starting point Ps. As shown in FIG. 13, the boundary line segment is set in order like, a boundary line segment L1 connecting the vertex P1 with the point Ps, and a boundary line segment L2 connecting the vertex P1 with a point $P_{L1}$.

After a single boundary line segment is added by the processing in step S102, the area decision processing unit 130 checks a validity of the current starting point (S104). A validity check of the current starting point is executed in accordance with a flowchart shown in FIG. 24.

As shown in FIG. 24, the area decision processing unit 130 first calculates a boundary vector connecting the current starting point with a point finally added on the drawing locus (S300), and normalizes the boundary vector (S302). Subsequently, the area decision processing unit 130 calculates an inner product of the boundary vector normalized in step S302 and a stress vector at the current starting point (S304). The stress vector is a perpendicular vector to a vector connecting a vertex newly included in the boundary region with the current starting point. Details of calculation processing of the stress vector are described later.

On the basis of a value of the inner product of the boundary vector and the stress vector calculated in step S304, the area decision processing unit 130 determines whether or not the current starting point can continue to be the starting point (S306). As a result of the determination in step S306, in the case where the inner product is less than zero, the area decision processing unit 130 determines that the current staring point does not continue to be the starting point (S308: the validity check is not OK). On the other hand, as a result of the determination in step S306, in the case where the inner product is zero or more, the area decision processing unit 130 determines that the current staring point continues to be the starting point (S308: the validity check is OK).

Going back to the explanation about FIG. 22, in the case where the validity check of the current starting point is not OK in step S104, the area decision processing unit 130 set a last starting point as the current starting point (S106), and repeats the processing from step S102. On the other hand, in the case where the validity check of the current starting point is OK in step S104, the area decision processing unit 130 keeps the current starting point as the starting point, and executes processing after step S108.

Here, there is provided a supplement explanation of the validity check of the starting point. An area definition line segment to prescribe a finally-defined area is formed by a vertex set as the starting point. The validity check of the starting point in step S104 determines whether or not the current starting point does not constitute an outline of an area prescribed by vertices and a drawing locus. In the case where it is determined that the current starting point does not constitute a vertex of the area, processing is continued with setting the last starting point as the current starting point.

Specifically, a last starting point is set as a current starting point in the case shown in FIG. 21. FIG. 21 shows vertices $P_A$, $P_B$, and $P_C$ that are designated by the user and a drawing locus $L_{in}$ that is a part of the drawing locus. The current starting point is the vertex $P_B$. The vertex $P_B$ and each point on the drawing locus $L_{in}$ are connected in order, and the connected line is added to the boundary region. In this process, as shown in the left-hand side of FIG. 21, it is determined that the vertex $P_B$ is not set as the starting point in the case where an inner product of a boundary line segment Ln (referred as a boundary vector in step S300) connecting the vertex $P_B$ with a point on the drawing locus $L_{in}$ and a stress vector V at the vertex $P_B$ is less than zero.

At this time, an angle θ formed by a finally-added boundary line segment Ln and the stress vector V at the vertex $P_B$ is an obtuse angle. In the case where the angle θ is an obtuse angle, it means that the vertex $P_B$ set as the current starting point is included in an area prescribed by a line segment connecting the vertex $P_A$ that is a last starting point with the vertex $P_C$ that is subsequently searched for.

Accordingly, as shown in the right-hand side of FIG. 21, in the case where an inner product of the boundary line segment Ln and the stress vector V at the vertex $P_B$ is less than zero, the vertex $P_A$ being the last starting point is set as a current starting point and each boundary line segment Ln is added.

Next, in the case where the validity check of the current starting point is OK, the area decision processing unit 130 calculates a boundary region formed by a boundary line segment initially set on the basis of a current starting point, a finally-added boundary line segment, and a part of a drawing locus included between these two boundary line segments. Subsequently, the area decision processing unit 130 determines whether or not a new vertex other than the current staring point is included in the boundary region (S108).

Figure 14:
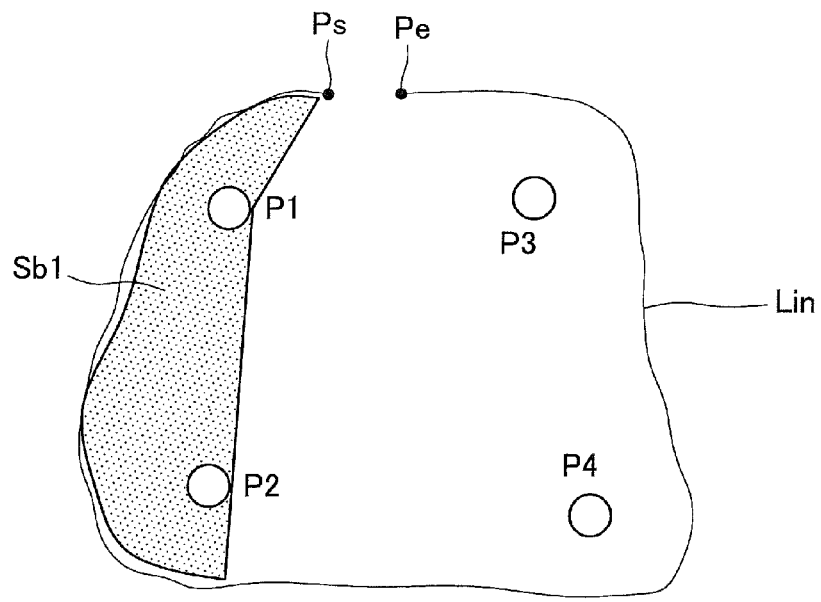
FIG. 14 is an explanatory diagram showing a state where a new vertex is included in the boundary region.

In the case where the new vertex is not included in step S108, the area decision processing unit 130 decides to expand the boundary region in which the current vertex is set as the starting point (S110), and repeats processing from step S102. On the other hand, in the case where the new vertex is included in step S108, the area decision processing unit 130 sets the vertex as a new starting point (S112). For example, as shown in FIG. 14, when the vertex P2 is included in a boundary region Sb1 in which the vertex P1 is set as the starting point, the area decision processing unit 130 sets the vertex P2 as a new starting point.

Figure 15:
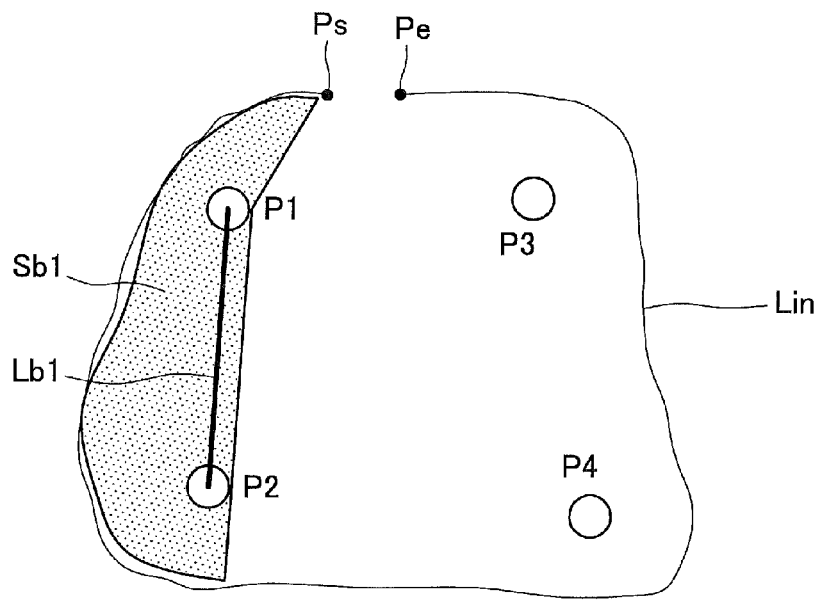
FIG. 15 is an explanatory diagram showing a state where an area definition line segment is set.

Next, the area decision processing unit 130 connects the last staring point and the new starting point, and sets an area definition line segment (S114). For example, as shown in FIG. 15, the vertex P1 that is the last staring point and the vertex P2 that is the new starting point are connected, and an area definition line segment Lb1 is set.

Subsequently, the area decision processing unit 130 applies a stress vector to the new starting point (S116). The stress vector is calculated on the basis of a perpendicular vector to a vector connecting the new starting point with the last starting point.

Specifically, the area decision processing unit 130 first calculates the perpendicular vector to the vector connecting the new starting point with the last starting point, and adjusts an orientation of the calculated perpendicular vector on the basis of an orientation of the boundary vector connecting the last starting point with a final point on the drawing locus. In the case where an inner product of the boundary vector and the vector connecting the new starting point and the last starting point is negative, the orientation of the calculated perpendicular vector is inverted. In the case where the inner product is zero or positive, the orientation of the calculated perpendicular vector is used without any change. Next, after adjusting the orientation, the area decision processing unit 130 performs normalization processing for converting the perpendicular vector to a unit vector, and sets the vector as a stress vector at the new starting point.

Figure 16:
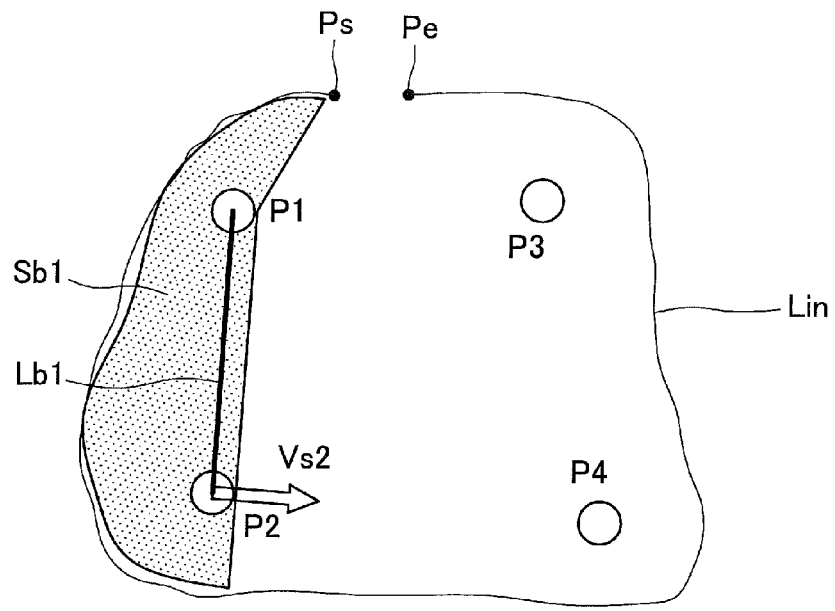
FIG. 16 is an explanatory diagram showing a state where a stress vector is applied to a new starting point.

For example, as shown in FIG. 16, a stress vector Vs2 is applied to the vertex P2 that becomes the new starting point in accordance with the processing in step S116.

Figure 17:
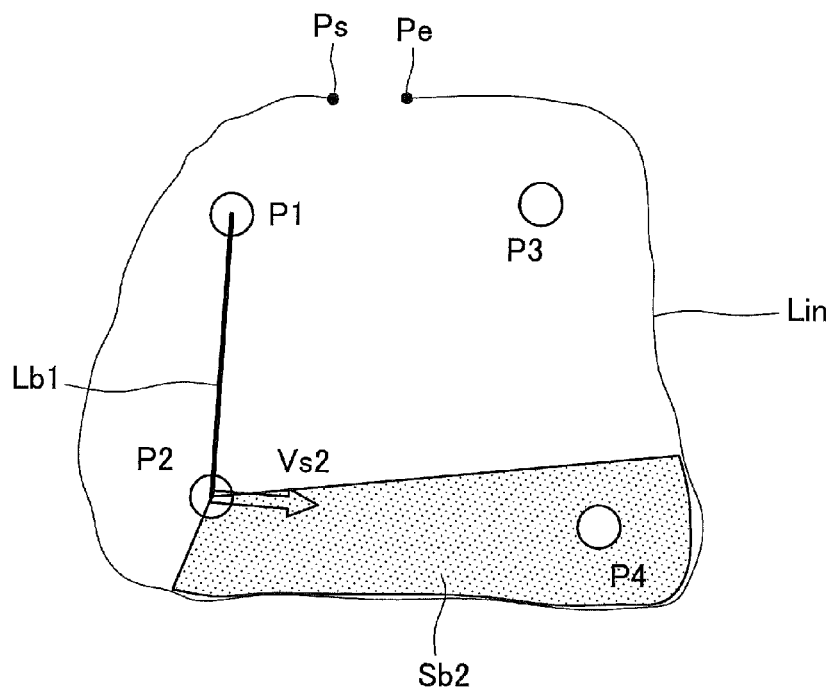
FIG. 17 is an explanatory diagram showing a state where a boundary region with respect to the new starting point is obtained.
Figure 18:
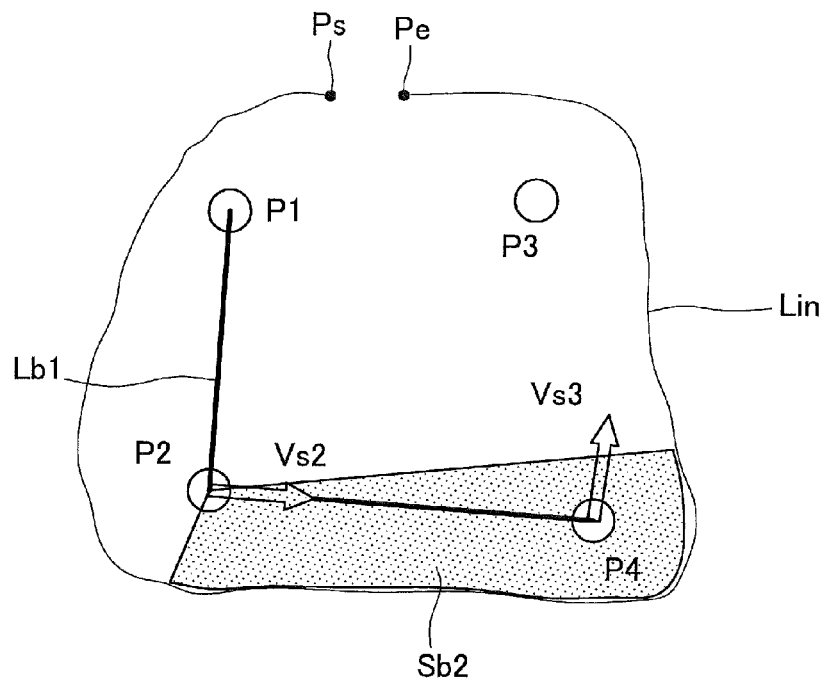
FIG. 18 is an explanatory diagram showing a state where a stress vector is applied to an additional new starting point.
Figure 19:
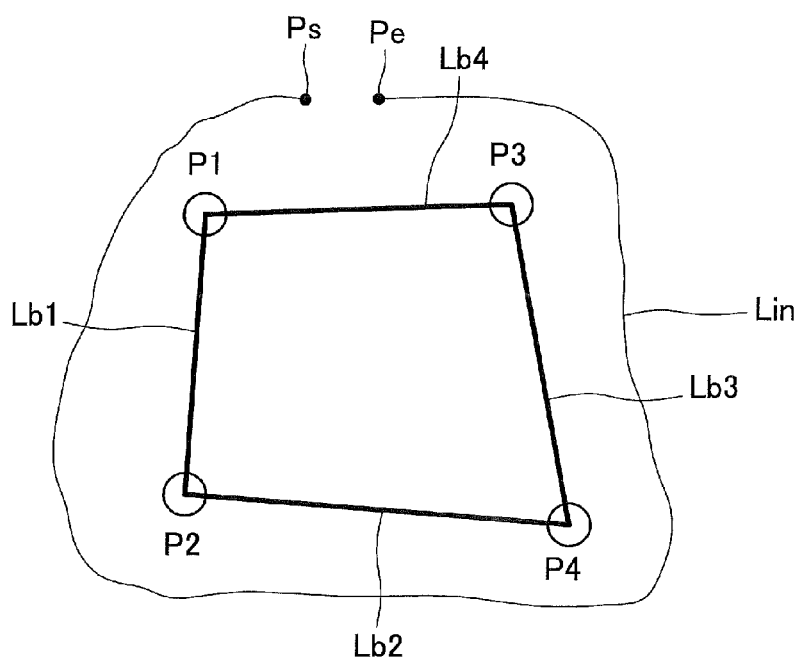
FIG. 19 is an explanatory diagram showing that the area is decided.

Next, the area decision processing unit 130 determines whether or not the new starting point becomes the first peg that is set in step S100 (S118). In the case where the new starting point is not the first peg, the area decision processing unit 130 repeats the processing from step S102 because an area to be defined is not closed. For example, as shown in FIGS. 17 and 18, the area decision processing unit 130 draws a boundary line segment on the basis of P2 that becomes the new starting point in FIG. 15, and repeats steps S102 to S110 until the next vertex P4 is included in a boundary region Sb2.

Subsequently, when the new starting point becomes the first peg in step S118, the area decision processing unit 130 connects the area definition line segments defined in the above processing in order, and decides an area S (S120). In an example shown in FIG. 19, the area S is defined by four area definition line segments Lb1, Lb2, Lb3, and Lb4.

After the area definition, latitude and longitude at a certain spot in each area are calculated and stored in association with each area information. In each of the area information, floor information may be included. It is preferable to set the certain spot in each area at a specific spot in an area, such as a center of gravity or a center point in the area, a position of an upper-left-most vertex from among a plurality of vertices in the area, or an entrance if the entrance is set in the area. The latitude and longitude at the certain spot in each area can be relatively calculated when two points (for example, the upper left point and the lower right point) of a floor map are associated with latitude-and-longitude information in advance.

As described above, latitude-and-longitude-and-floor information is associated with each area information, the information is stored, and then a name or the like of a shop is registered. Accordingly, it can be used as information necessary for searching for a route to a certain shop and searching for a neighboring shop by using a map app and the like.

In the above paragraphs, there is described the area definition processing performed by the information processing device 100 according to the embodiment of the present disclosure. In order to simplify the explanation, the example shown in FIGS. 12 to 19 is about the situation where a drawing locus including all of the designated four vertices is input. However, the area definition processing according to the embodiment can also be applied to a situation where there are a lot of vertices and a complicated drawing locus.

For example, when finding a boundary region based on a certain starting point, a plurality of vertices are included in the boundary region by a single processing. A drawing locus $L_{in}$ is input by moving a cursor using a mouse or by moving an operation body while keeping the operation body on the screen. In this situation, the input drawing locus $L_{in}$ is an array of discretized points, and points are added to the array at a certain time interval by recording a current position of a cursor operated by a mouse or a current touch position of an operation body.

In the case where a time interval for adding points is short, it can be assumed that each line segment constituting the drawing locus $L_{in}$ is short. In this case, it can be considered that, even if a line segment connecting a point with a point is added, a single vertex is newly included in the region at most. On the other hand, in the case where a position of a cursor or a touch position is moved more than a last recorded position in time before a next point is added, a plurality of vertices may be included when a line segment is added, the line segment connecting points constituting the drawing locus $L_{in}$.

Figure 20:
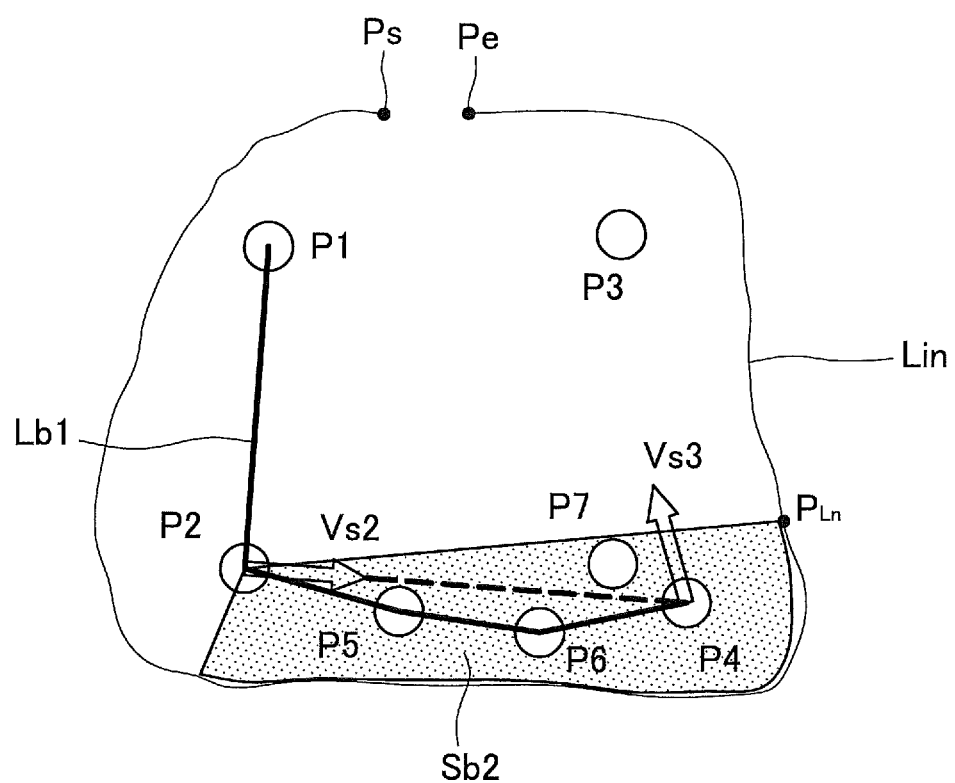
FIG. 20 is an explanatory diagram illustrating a way to decide an starting point and an area definition line segment when the plurality of vertices are included in a boundary region.

For example, as shown in FIG. 20, it is assumed that a boundary region Sb2 is expanded on the basis of the vertex P2 set as a starting point, and the boundary region Sb2 including the vertices P2, P4, P5, P6, and P7 is set. At this time, the area decision processing unit 130 decides an area definition line segment in accordance with the processing shown in FIG. 25.

First, the area decision processing unit 130 searches the boundary region for a vertex (best_peg) nearest to a point that is finally added on the drawing locus (S400). The vertex (best_peg) nearest to the point finally-added on the drawing locus is defined as a new staring point. In the example shown in FIG. 20, the vertex P4 positioned nearest to a point $P_{Ln}$ finally-added on the drawing locus $L_{in}$ becomes a new vertex and a stress vector Vs3 is applied to the vertex P4.

Subsequently, the area decision processing unit 130 specifies a vertex positioned outside a line segment connecting the original starting point with a new starting point from among vertices other than the starting points (S402). In the example shown in FIG. 20, the vertices P5 and P6 are specified as vertices positioned outside a line segment connecting the vertices P2 and P3. The vertex P7 positioned inside the line segment connecting the vertices P2 and P3 can be ignored because the vertex P7 is included in an area by setting the line segment connecting the vertices P2 and P3 as the area definition line segment.

Next, when there are the original starting point, the new starting point, and the vertex specified in step S402, the area decision processing unit 130 connects the vertices in order, and sets the area definition line segment (S404). In the example shown in FIG. 20, the area definition line segment connecting the vertices P2-P5-P6-P4 is set. As described above, when a plurality of vertices are included in the boundary region by a single processing, the area definition line segment is set by the processing shown in FIG. 25, and the designated vertices can be included in the defined area without omission on the basis of the designated vertices and the drawing locus.

The drawing locus input by the user may be input so as to include a vertex to be included in a defined area, and the drawing locus may be any shape. With regard to the drawing locus, a drawing starting point Ps is not necessarily match with a drawing end point Pe. In the case where the drawing locus is not closed, the drawing starting point Ps is connected with the drawing end point Pe at the start of processing shown in FIG. 22. Accordingly, an area that is not intended by the user may be defined depending on a positional relation of designated vertices, a drawing starting point Ps, and a drawing end point Pe. In this case, the user may performs processing for deleting the designated area by editing processing described later, and may input a drawing locus again with respect to the designated vertices.

4. AREA EDITING

4.1. Plural Area Setting

Figure 26:
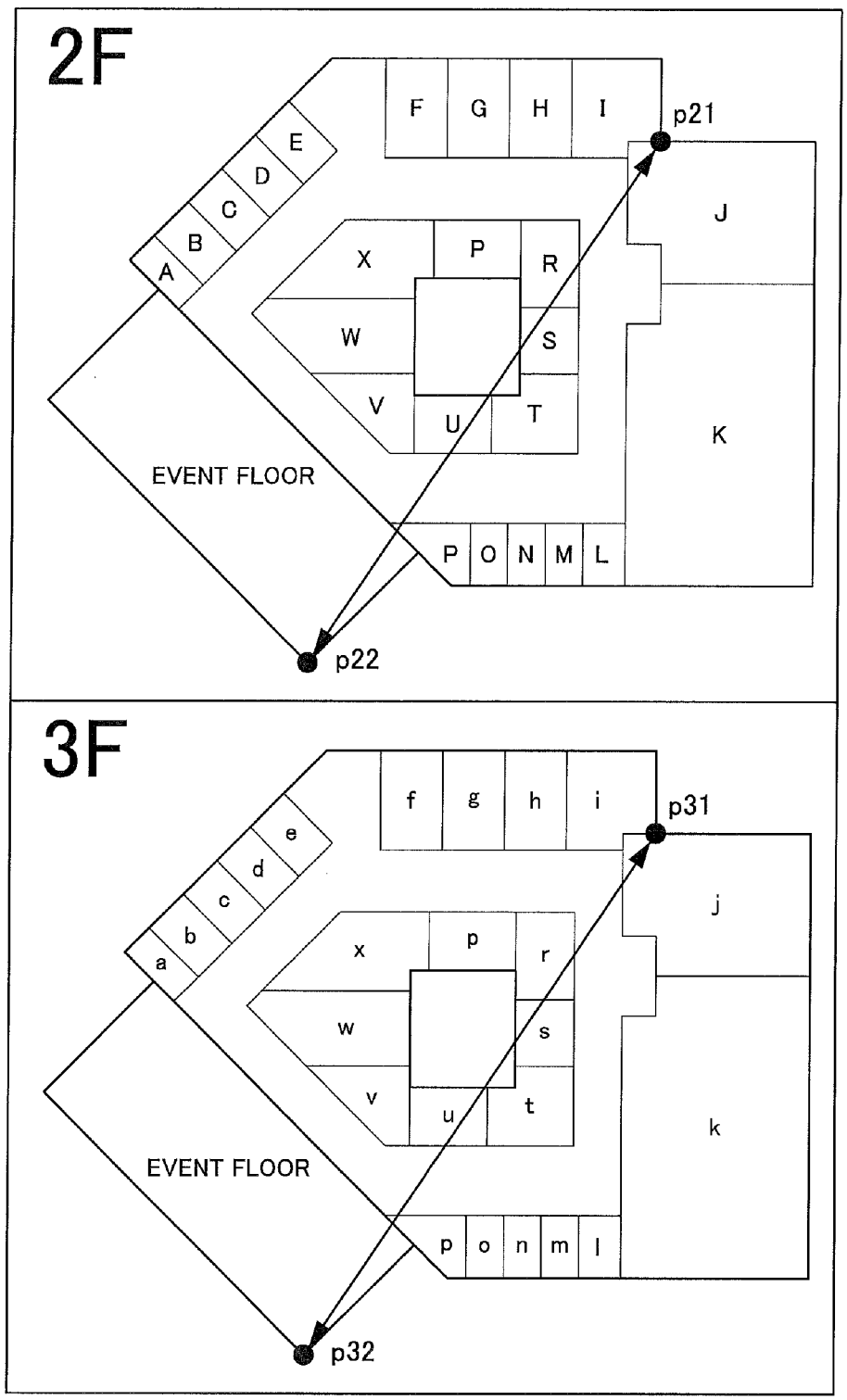
FIG. 26 is an explanatory diagram illustrating association of a plurality of floor maps.

One or plurality of areas defined by the above described area definition processing can be reflected in, for example, a map having a similar layout. For example, as shown in FIG. 26, a layout of each floor is similarly set in a building. At this time, areas can be defined for respective floors, or an area defined for a floor can be reflected in other floors when defining areas being on different floors and having the same position.

In this situation, the user set reference points in associated floors, respectively in advance. For example, as shown in FIG. 26, the reference points may be set to two corners approximately positioned on a diagonal of the map. In FIG. 26, reference points p21 and p22 are designated on a map of second floor, and reference points p31 and p32 are designated on a map of third floor. On the basis of the reference points, floor maps of respective floors are associated with each other.

Figure 27:
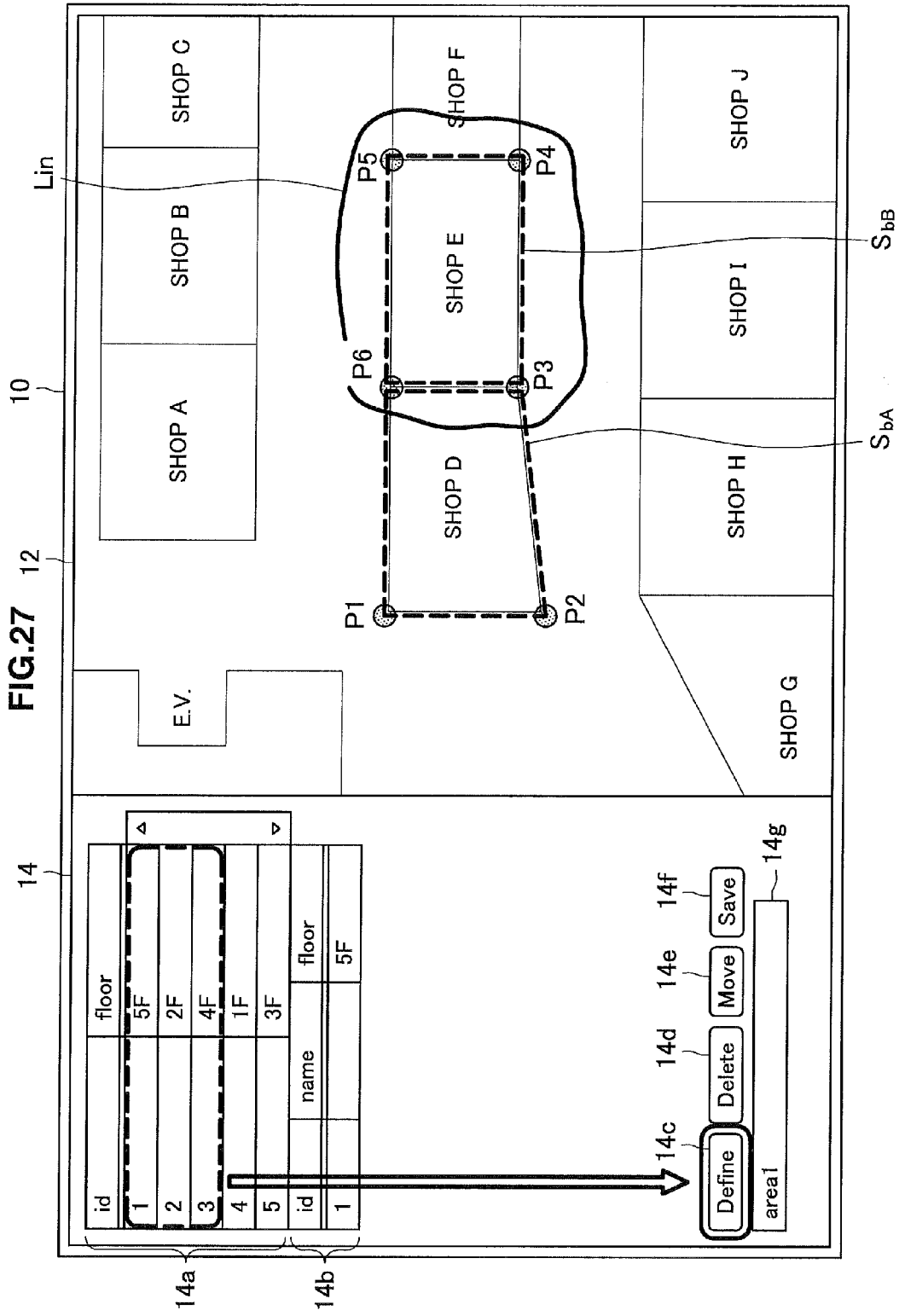
FIG. 27 is an explanatory diagram showing a procedure of area definition with respect to a plurality of floor maps.

For example, as shown in FIG. 27, in the case where a plurality of maps are associated with each other in advance, a map of a floor is displayed in a target display region 12 of a display unit 10 and six vertices P1 to P6 are designated. At this time, area definition processing performed by the information processing device 100 sets an area definition line segment, and areas SbA and SbB are defined, by inputting a drawing locus $L_{in}$ in a manner that vertices to be included in an area to be defined are included.

As shown in FIG. 27, a reflection target is designated from among a target list 14a, a "Define" button 14c is pushed, and the same areas as the areas SbA and SbB are defined with respect to the designated floor, the areas SbA and SbB being designated with respect to a map of a single floor. As described above, areas in a plurality of map can be defined without repeatedly performing vertices designations and drawing-locus input many times. Accordingly, an input load on a user can be reduced.

4.2. Area Editing by User

The area defined by the area definition processing can be edited by the user after the definition. For example, it can be possible to expand or reduce an area by moving a vertex of a defined area, and to delete a vertex which prescribes the area. The area editing can be performed by selecting a target on the target display region 12 shown in FIG. 1, or by inputting an operation on the operation input region 14, for example.

For example, in the case of moving a vertex of an area, the user first selects a processing target including an area to be edited from among a target list 14A, displays the processing target on the target display region 12, and selects the area to be edited from among a defined area list 14 b. Subsequently, the user pushes an "Edit" button 14 h for putting the selected area into an editable state, and starts to edit the area.

After the area becomes the editable state, the user edits the area on the target display region 12. For example, editing such as changing a position of a vertex is possible by a drag operation for selecting and moving, by using a pointer, one of vertices prescribing the area. In the right-hand side of FIG. 28, the user moves a vertex P5 to a P5a position, from among vertices P1 to P5 constituting an area S. Next, the user pushes a "Move" button 14e, and the movement of the vertex is determined.

The information processing device 100 receives the push of the "Move" button 14e, and then corrects an area definition line segment Lb4 connecting the vertices P4 and P5 to an area definition line segment Lb4a connecting the vertices P4 and P5a. In a similar way, an area definition line segment Lb5 connecting the vertices P5 and P1 is corrected to an area definition line segment Lb5a connecting the vertices P5a and P1. Accordingly, a new area is set by the vertices P1-P2-P3-P4-P5a.

On the other hand, for example, in the case of deleting a vertex of an area, the user selects a processing target including an area to be edited from among a target list 14A, displays the processing target on the target display region 12, and selects the area to be edited from among a defined area list 14 b in a similar way as described above. Subsequently, the user pushes the "Edit" button 14 h for putting the selected area into an editable state, and starts to edit the area.

After the area becomes the editable state, the user edits the area on the target display region 12. When deleting a vertex designating the area, the user selects, by using a pointer, a vertex to be deleted on the target display region 12, pushes a "Delete" button 14d, and the delete of the selected vertex is determined.

The information processing device 100 receives the push of the "Delete" button 14d, and then deletes the delete-target vertex and area definition line segments connected with the delete-target vertex. With regard to vertices prescribing an area, two area definition line segments are connected with a single vertex. Accordingly, when a single vertex is deleted, two area designation line segments are deleted. Subsequently, two vertices that were connected with the deleted vertex are directly connected, and a new area definition line segment is added. Accordingly, a new area is set.

Setting of a new area may be performed automatically by the information processing device 100, or may be performed by the user.

5. CONCLUSION

From the above, there are described configurations of the information processing device 100 according to the embodiments of the present disclosure, and area definition processing thereby. According to the embodiments of the present disclosure, when defining an area in a processing target such as a map, a user only designates at least three vertices on the processing target, and inputs a drawing locus so as to surround a vertex to be included in an area, and the area is automatically defined. Accordingly, it is possible to reduce attention paid by the user in the case of the area definition and to easily define an area.

It should be understood by those skilled in the art that various modifications, combinations, sub-combinations and alterations may occur depending on design requirements and other factors insofar as they are within the scope of the appended claims or the equivalents thereof.

For example, in the above embodiments, a map such as a floor map is set as a processing target. However, embodiments of the disclosure are not limited thereto.

Additionally, the present technology may also be configured as below:

(1) An information processing device including:
an area decision processing unit configured to set, on the basis of at least three vertices designated to decide a boundary of an area to be defined in a map and on the basis of a drawing locus input to include at least three of the vertices, a boundary region by sequentially adding boundary line segments connecting one of the vertices to be a starting point from among the vertices included inside the drawing locus with points on the drawing locus in accordance with an input order of the drawing locus, configured to sequentially decide the vertices constituting respective area definition line segments for deciding the boundary of the area, and configured to decide, as the area, a region prescribed by connecting the area definition line segments.

(2) The information processing device according to (1),
wherein, when a new vertex is included in the boundary region with respect to the one of the vertices set as the starting point, the area decision processing unit decides the vertex as a new starting point, decides a line segment connecting the new starting point with an old starting point as an area definition line segment, and repeats processing for deciding the area definition line segment until the new starting point returns to an initially-set starting point.

(3) The information processing device according to (2),
wherein, when there is a vertex other than the new starting point and the old starting point in the boundary region formed to prescribe the line segment connecting the new starting point with the old starting point, the area decision processing unit excludes, from vertices for defining the area, the vertex positioned outside of the drawing locus or outside of the area defined by the line segment connecting the new starting point with the old starting point.

(4) The information processing device according to (2) or (3),
wherein the area decision processing unit applies a stress vector to the new staring point, the stress vector being perpendicular to a line segment connecting the new starting point with the old starting point.

(5) The information processing device according to (4),
wherein the area decision processing unit
determines whether or not an inner product of a vector represented by the newly-added line segment and the stress vector at a current starting point is less than zero, when a boundary line segment connecting the current starting point and a point on the drawing locus is added, and
changes the starting point from the current starting point to a last starting point, in a case where the inner product is less than zero.

(6) The information processing device according to any one of (1) to (5),
wherein vertices to prescribe the defined area are movable in response to operation input by a user, and
wherein, in a case where a vertex to prescribe the area is moved, the area decision processing unit redefines an area based on the moved vertex.

(7) The information processing device according to any one of (1) to (6),
wherein vertices to prescribe the defined area are deletable in response to operation input by a user, and
wherein, in a case where a vertex to prescribe the determined area is deleted, the area decision processing unit deletes the area definition line segments connected the deleted vertex, and directly connects two vertices connected to the deleted vertex so as to set a new area definition line segment.

(8) An information processing method including:
detecting at least three vertices designated to decide a boundary of an area to be defined in a map and a drawing locus input to include at least three of the vertices;
setting, on the basis of the vertices and the drawing locus, a boundary region by sequentially adding boundary line segments connecting one of the vertices to be a starting point from among the vertices included inside the drawing locus with points on the drawing locus in accordance with an input order of the drawing locus, and sequentially deciding the vertices constituting respective area definition line segments for deciding the boundary of the area; and
deciding, as the area, a region prescribed by connecting the area definition line segments.

(9) A non-transitory computer-readable recording medium having a program stored therein, the program causing a computer to execute:
setting, on the basis of at least three vertices designated to decide a boundary of an area to be defined in a map and on the basis of a drawing locus input to include at least three of the vertices, a boundary region by sequentially adding boundary line segments connecting one of the vertices to be a starting point from among the vertices included inside the drawing locus with points on the drawing locus in accordance with an input order of the drawing locus, and sequentially deciding the vertices constituting respective area definition line segments for deciding the boundary of the area; and
deciding, as the area, a region prescribed by connecting the area definition line segments.

What is claimed is:

1. An information processing device comprising:
   a memory configured to store instructions;
   a display configured to display a map; and
   a Central Processing Unit (CPU) configured to execute the instructions stored in the memory, wherein the CPU is configured to:
   set, based on at least three vertices designated to decide a boundary of an area to be defined in the map and based on a drawing locus input to include at least three of the vertices, a boundary region by sequentially adding boundary line segments connecting one of the vertices with points on the drawing locus in accordance with an input order of the drawing locus, wherein the one of the vertices is a starting point from among the vertices included inside the drawing locus,
   sequentially decide the vertices constituting respective area definition line segments for deciding the boundary of the area; and
   decide, as the area, a region prescribed by connecting the area definition line segments,
   wherein, in an event a new vertex is included in the boundary region with respect to the starting point, the CPU is configured to:
   decide the new vertex as a new starting point, and
   connect the new starting point with an old starting point using a line segment.

2. The information processing device according to claim 1,
   wherein, in the event the new vertex is included in the boundary region with respect to the starting point, the CPU is configured to decide the line segment connecting the new starting point with the old starting point as an area definition line segment, and repeat processing for deciding the area definition line segment until the new starting point returns to an initially-set starting point.

3. The information processing device according to claim 2,
   wherein, in an event there is a vertex other than the new starting point and the old starting point in the boundary region formed to prescribe the line segment connecting the new starting point with the old starting point, the CPU is configured to exclude, from the vertices for defining the area, the vertex positioned outside of the drawing locus or outside of the area defined by the line segment connecting the new starting point with the old starting point.

4. The information processing device according to claim 2, wherein the CPU is configured to apply a stress vector to the new starting point, the stress vector being perpendicular to a line segment connecting the new starting point with the old starting point.

5. The information processing device according to claim 4, wherein the CPU is configured to:
   determine whether or not an inner product of a vector represented by the line segment connecting the new starting point with the old starting point and the stress vector at a current starting point is less than zero, in an event a boundary line segment connecting the current starting point and a point on the drawing locus is added, and
   change the starting point from the current starting point to an immediately previous starting point, in an event the inner product is less than zero.

6. The information processing device according to claim 1,
   wherein the vertices to prescribe the defined area are movable in response to an operation input by a user, and
   wherein, in an event a vertex to prescribe the area is moved, the CPU is configured to redefine the area based on the moved vertex.

7. The information processing device according to claim 1,
   wherein the vertices to prescribe the defined area are deletable in response to an operation input by a user, and
   wherein, in an event a vertex to prescribe the determined area is deleted, the CPU is configured to delete the area definition line segments connecting the deleted vertex, and directly connect two vertices connected to the deleted vertex so as to set a new area definition line segment.

8. An information processing method comprising:
   detecting at least three vertices designated to decide a boundary of an area to be defined in a map and a drawing locus input to include at least three of the vertices;
   setting, based on the vertices and the drawing locus, a boundary region by sequentially adding boundary line segments connecting one of the vertices with points on the drawing locus in accordance with an input order of the drawing locus,
   wherein the one of the vertices is a starting point from among the vertices included inside the drawing locus;
   sequentially deciding the vertices constituting respective area definition line segments for deciding the boundary of the area;
   deciding, as the area, a region prescribed by connecting the area definition line segments,
   wherein, in an event a new vertex is included in the boundary region with respect to the starting point,
   deciding the new vertex as a new starting point, and
   connecting the new starting point with an old starting point using a line segment.

9. A non-transitory computer-readable recording medium having a set of computer-executable instructions stored thereon, the instructions causing a computer to execute:
   setting, based on at least three vertices designated to decide a boundary of an area to be defined in a map and on the basis of a drawing locus input to include at least three of the vertices, a boundary region by sequentially adding boundary line segments connecting one of the vertices with points on the drawing locus in accordance with an input order of the drawing locus,
   wherein the one of the vertices is a starting point from among the vertices included inside the drawing locus;
   sequentially deciding the vertices constituting respective area definition line segments for deciding the boundary of the area;
   deciding, as the area, a region prescribed by connecting the area definition line segments,
   wherein, in an event a new vertex is included in the boundary region with respect to the starting point,
   deciding the new vertex as a new starting point, and
   connecting the new starting point with an old starting point using a line segment.

10. An information processing device comprising:
a memory configured to store instructions;
a display configured to display a map; and
a Central Processing Unit (CPU) configured to execute the instructions stored in the memory, wherein the CPU is configured to:
  set, based on at least three vertices designated to decide a boundary of an area to be defined in the map and based on a drawing locus input to include at least three of the vertices, a boundary region by sequentially adding boundary line segments connecting one of the vertices with points on the drawing locus in accordance with an input order of the drawing locus,
  wherein the one of the vertices is a starting point from among the vertices included inside the drawing locus,
  sequentially decide the vertices constituting respective area definition line segments for deciding the boundary of the area; and
  decide, as the area, a region prescribed by connecting the area definition line segments,
wherein, in the event a new vertex is included in the boundary region with respect to the starting point, the CPU is configured to:
  decide the new vertex as a new starting point,
  decide a line segment connecting the new starting point with an old starting point as an area definition line segment, and
  repeat processing for deciding the area definition line segment until the new starting point returns to an initially-set starting point.

* * * * *